United States Patent
Huo et al.

(10) Patent No.: US 8,150,110 B2
(45) Date of Patent: Apr. 3, 2012

(54) ROI-BASED RENDERING FOR DIAGNOSTIC IMAGE CONSISTENCY

(75) Inventors: Zhimin Huo, Pittsford, NY (US); Minjie Chen, Shanghai (CN)

(73) Assignee: Carestream Health, Inc., Rochester, NY (US)

( * ) Notice: Subject to any disclaimer, the term of this patent is extended or adjusted under 35 U.S.C. 154(b) by 1262 days.

(21) Appl. No.: 11/615,082

(22) Filed: Dec. 22, 2006

(65) Prior Publication Data

US 2008/0118139 A1    May 22, 2008

Related U.S. Application Data

(60) Provisional application No. 60/866,936, filed on Nov. 22, 2006.

(51) Int. Cl.
*G06K 9/00* (2006.01)

(52) U.S. Cl. .......................................... 382/128

(58) Field of Classification Search .......... 382/128–134, 382/173–180
See application file for complete search history.

(56) References Cited

U.S. PATENT DOCUMENTS

| | | | |
|---|---|---|---|
| 4,302,672 A | 11/1981 | Kato et al. | |
| 4,656,665 A * | 4/1987 | Pennebaker | 382/172 |
| 5,042,077 A * | 8/1991 | Burke | 382/169 |
| 5,046,118 A * | 9/1991 | Ajewole et al. | 382/169 |
| 5,170,347 A * | 12/1992 | Tuy et al. | 345/419 |
| 5,268,967 A | 12/1993 | Jang et al. | |
| 5,357,549 A | 10/1994 | Maack et al. | |
| 5,633,511 A | 5/1997 | Lee et al. | |
| 5,835,618 A | 11/1998 | Fang et al. | |
| 6,195,474 B1 * | 2/2001 | Snyder et al. | 382/312 |
| 6,778,691 B1 | 8/2004 | Barski et al. | |
| 7,054,485 B2 * | 5/2006 | Li et al. | 382/172 |
| 7,391,895 B2 * | 6/2008 | Wang et al. | 382/132 |
| 2004/0109594 A1 * | 6/2004 | Luo et al. | 382/132 |
| 2004/0170308 A1 | 9/2004 | Belykh et al. | |

OTHER PUBLICATIONS

Anant Madabhushi et al., "New methods of MR image intensity standardization via generalized scale," Medical Physics, vol. 33, No. 9, Sep. 2006, pp. 3426-3434.

* cited by examiner

*Primary Examiner* — Alex Liew

(57) ABSTRACT

A method for consistent rendering of two or more diagnostic images according to a region of interest. Image data as input code values are obtained for each of the two or more diagnostic images. The background image content is segmented from tissue image content for each of the two or more diagnostic images. Corresponding structures are identified within the tissue image content, and the region of interest is identified within the tissue image content for each of the two or more diagnostic images. The input code values are remapped to output code values for each of the two or more diagnostic images.

24 Claims, 26 Drawing Sheets

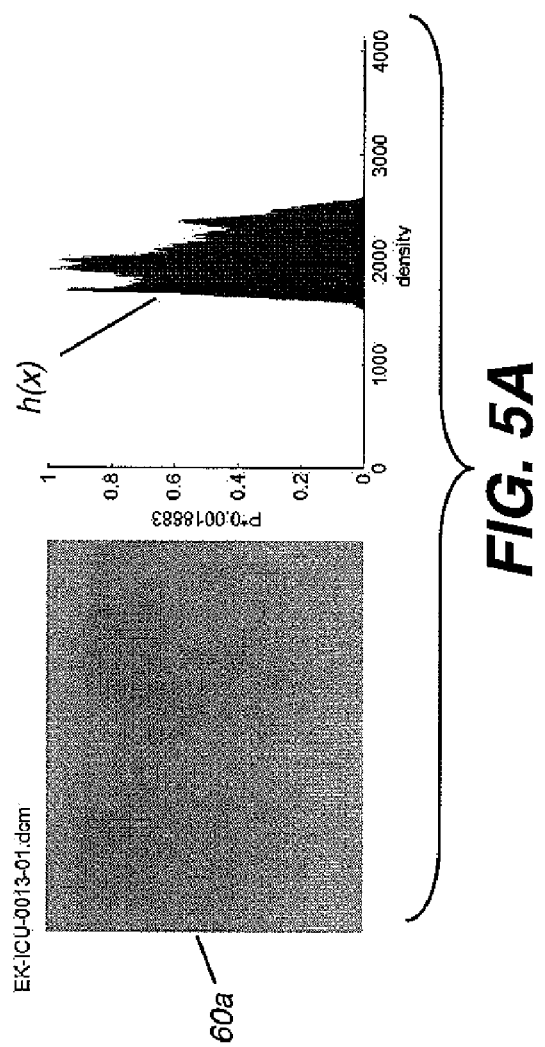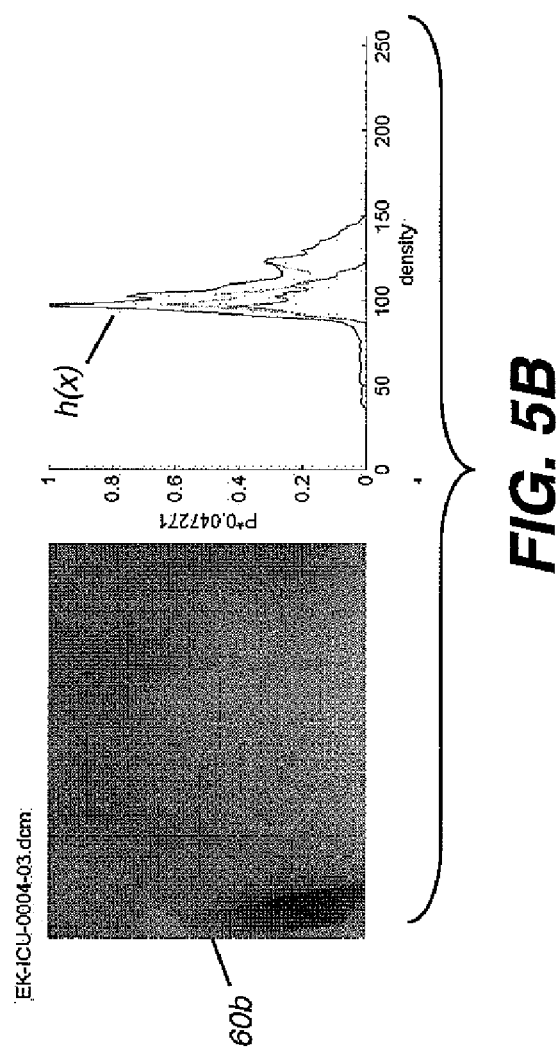

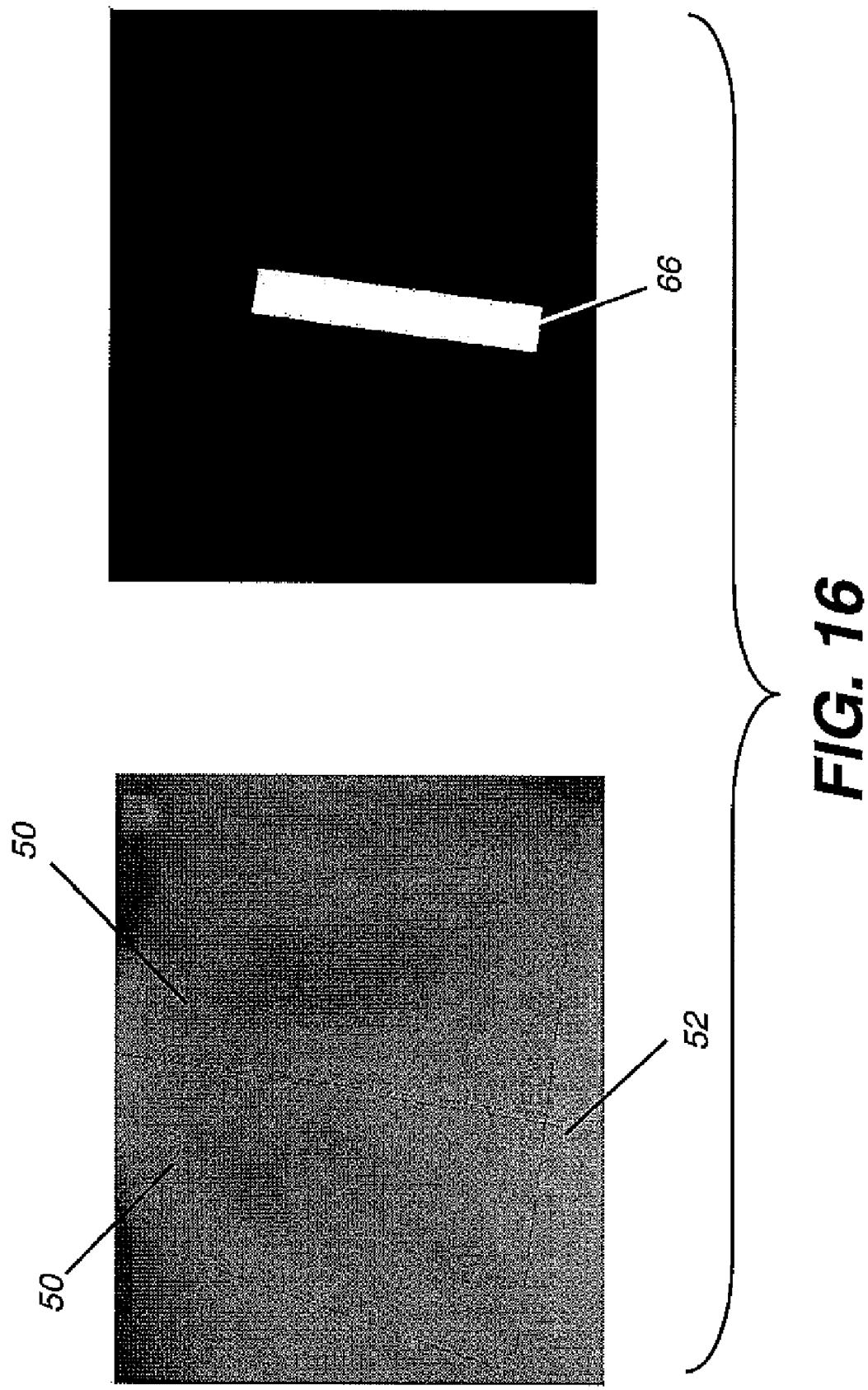

ROI-BASED RENDERING FOR DIAGNOSTIC IMAGE CONSISTENCY

CROSS REFERENCE TO RELATED APPLICATIONS

Reference is made to, and priority is claimed from, commonly assigned U.S. Provisional Patent Application No. 60/866,936, entitled "ROI-BASED RENDERING FOR DIAGNOSTIC IMAGE CONSISTENCY", provisionally filed on Nov. 22, 2006 in the name of Huo, and which is assigned to the assignee of this application.

FIELD OF THE INVENTION

This invention generally relates to processing of diagnostic images and more particularly to a method and system for enhancing diagnostic images taken at different times in order to provide consistent rendering for regions of interest (ROI) based on analysis of image content over those regions.

BACKGROUND OF THE INVENTION

Clinical evaluation of patients in an Intensive Care Unit (ICU) often rely on diagnostic images, such as portable chest radiographic images, for example. It has been noted that chest radiographs can be particularly helpful in the ICU for indicating significant or unexpected conditions requiring changes in patient management. For this reason, a number of such images may be obtained periodically from the patient during a treatment period in the ICU.

To meet the need for readily accessible and rapid diagnostic imaging, equipment such as portable chest radiography equipment has been developed, allowing the ICU clinician to conveniently obtain a radiographic image as needed for the patient. A single diagnostic image may show a condition related to treatment procedures, such as a collapsed lung, for example, or the proper or improper placement of tubing within the patient. A succession of diagnostic images, taken over a time period, may help to show the progress of a patient's condition and help direct ICU treatment accordingly. While portable radiography has advantages for improving patient care, however, there are some difficulties that limit the accuracy and usefulness of diagnostic images in the ICU. Differences in image quality from one image to the next can be significant, owing to differences in exposure settings, patient and apparatus positioning, scattering, and grid application, for example. Thus, even for images obtained from the same patient over a short treatment interval, there can be substantial differences between two or more images that prevent effective comparison between them and constrain the ability of the clinician to detect subtle changes that can be highly significant. This problem relates to images whether originally obtained on film and scanned, or digitally obtained, such as using a computed radiography (CR) or digital radiography (DR) system.

Computed radiography systems that use storage phosphors and digital radiography systems can offer a very wide exposure latitude (as much as 10,000:1) compared with that available from conventional screen/film systems, (typically 40:1). This means that exposure error is much less serious for computed radiography at the time of image sensing and recording. However, image display apparatus have a much more limited dynamic range. Tone scale mapping in computed radiography can be specifically tailored to provide an optimal rendition of every individual image. However, most output media, such as photographic film and cathode ray tube (CRT) displays, do not have wide enough dynamic ranges to display the 10,000:1 latitude of information with proper visual contrast. It is, therefore, necessary to carefully allocate the available output dynamic range to display the clinically important part of the input code values. For some applications, the range of the region of interest in the input image may exceed that provided by the output media or display, and the contrast of parts of the input image may then be compromised as a result. For example, U.S. Pat. No. 4,302,672 entitled "Image Gradation Processing Method And Apparatus For Radiation Image Recording System" to Kato et al. teaches a method of constructing such a compromised tone-scale curve for chest x-ray images. However, that method uses the valleys and peaks of the code-value histogram to identify the critical points between the spine, the heart, and the lung. The results are not very reliable because these valleys and peaks are not always clearly detectable. This method requires that all images obtained have the same overall spatial profile, which need not be true. Furthermore, the method cannot be generalized to examinations other than chest images.

There are generally five classes of "objects" in radiographic images: (1) foreground (collimator blades used to protect parts of the body from unnecessary x-ray exposure) usually corresponding to very low to low exposure areas; (2) man-made objects (such as pacemakers, tubes, and electrodes); (3) soft tissues (such as muscles, blood vessels, and intestines) usually correspond to low (e.g., mediastinum) to high (e.g., lung) exposures depending on the thickness; (4) bones corresponding to the very low to low exposures (often overlapping with the foreground); and (5) background corresponding to very high exposure areas. These five classes of objects can be difficult to separate using the code value alone because, there can be considerable overlaps (such as with the bone and the collimator blades).

As noted in commonly assigned U.S. Pat. No. 5,633,511 entitled "Automatic Tone Scale Adjustment Using Image Activity Measures" to Lee et al., two issues in adjusting tone scale for computed radiography relate, to: (1) determining which sub-range of the input code values is most important for clinical evaluation and (2) constructing a tone-scale transfer curve so that the important sub-range of the code values identified in step (1) can be rendered with proper contrast and brightness (density) on the output media. For example, the digital code values of an input chest x-ray image may span from 500 to 3000 (in units of 0.001 log exposure), but, the code value range of the lung area, being the most important region of the image, may span from about 1800 to 2600. Simply mapping the entire range of the input code value (from 500 to 3000) to the available film density range with equal contrast for all input code values produces a chest image with an unacceptably low contrast. It is, therefore, desirable to have an automatic algorithm to detect and select the relevant sub-range of the input code values (typically 1800 to 2600) to display on the output media with proper visual contrast and brightness. The process of selecting the relevant sub-range of input code values and constructing the proper mapping function from the input code value to the output display media is termed tone scale adjustment.

The Lee et al. '511 disclosure describes conventional approaches for identifying the sub-range of interest in the image, using a histogram of input code values, then discloses an alternative for identifying this sub-range, using an activity histogram. The activity histogram disclosed in the Lee et al. '511 patent gives a measure of line-by-line image activity that improves overall image rendering and has advantages for achieving improved image contrast and brightness.

Relating to the techniques of the Lee et al. '511 patent, a contrast enhancement method is disclosed in commonly assigned U.S. Pat. No. 6,778,691 entitled "Method of Automatically Determining Tone-Scale Parameters for a Digital Image" to Barski et al. The method of the Barski et all. '691 disclosure automatically generates a Look-Up Table (LUT) for obtaining a desired tone scale for an image, using the slope of the tone scale curve over its mid-range densities.

Conventional methods for adjusting the intensity range and slope of diagnostic image values have not provided completely satisfactory results. While methods such as those described in the Lee et al. '511 patent and in the Barski et al. '691 patent provide improvements in contrast enhancement for a diagnostic image, these methods do not address the problem of consistent rendering between images taken for a patient at different times. For example, where two or more images for a patient taken at different times differ with respect to exposure values or other values, application of such contrast improvement techniques is not likely to provide consistent rendering that would allow more accurate assessment of condition changes by the ICU clinician.

Contrast stretching is one method that has been proposed for providing a measure of normalization between images. For example, U.S. Pat. No. 5,357,549 (Maack) describes a dynamic range compression technique that stretches image intensity in only a particular area of interest, such as within the lung area of a chest X-ray. The proposed method locates low frequency components, determines equalization factors, and then applies these to the image for compressing low frequency components, freeing the remainder of the dynamic range for higher frequency areas of the image intensities. In a similar approach, U.S. Pat. No. 5,835,618 (Fang) uses a method of dynamic range remapping for enhancing the image in both dark and bright intensity areas. This remapping or correction technique amounts to smoothing the data (such as through a low-pass filter), determining the data mean, adjusting the smoothed data to the mean, and then applying smoothed, adjusted data to the original data. However, these and other conventional contrast-stretching methods may result in unacceptable levels of loss or distortion of the original image data.

Thus, there remains a need for consistent rendering of diagnostic images taken over a period of time, particularly for patients in an ICU or similar care facility.

SUMMARY OF THE INVENTION

It is an object of the present invention to provide a method for providing consistent rendering of two or more diagnostic images according to a region of interest, the method comprising: a) obtaining image data as input code values for each of the two or more diagnostic images; b) segmenting background image content from tissue image content for each of the two or more diagnostic images; c) identifying corresponding structures within the tissue image content and identifying the region of interest within the tissue image content for each of the two or more diagnostic images; and d) remapping input code values to output code values for each of the two or more diagnostic images with the steps of: (i) calculating an upper remapping value that is conditioned according to relative spatial position of the region of interest within the diagnostic image content for each diagnostic image; (ii) calculating a lower remapping value that is conditioned by a normalization factor that is obtained according to image data values from a landmark area that is within the diagnostic image and lies outside the region of interest; and (iii) remapping the input code values for each pixel within the region of interest to a remapped value in the range defined between and including the upper remapping value and the lower remapping value.

It is a feature of the present invention that it provides a method for improving the rendering consistency of two or more images, based on characteristics of the region of interest (ROI).

It is an advantage of the present invention it adapts to different imaging apparatus and equipment, so that images taken at different times or on different imaging systems can be processed and compared.

These and other objects, features, and advantages of the present invention will become apparent to those skilled in the art upon a leading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 5A, 5B, 5C, and 5D each show a diagnostic image having a separate class of characteristics and example histograms based on their corresponding images.

FIG. 16 shows plan views of a spine image and its spine mask generated using image data.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The present invention provides an ROI-based gray-scale normalization for consistent rendering of diagnostic images. The method of the present invention provides a remapping of density values for diagnostic images that provides a consistent rendering of images taken at different times and under different conditions, thus enabling the ICU clinician to more easily compare images and to track patient progress. The basic principle requires identifying the region of interest (ROI) in each image as separate from the background and adjusting image contrast values for content within the ROI to a suitable range for each image, so that comparison of one image to another is feasible. With regard to diagnostic image processing, the method of the present invention pre-processes the diagnostic image. The resulting rendered image from this process can then be provided to image enhancement utilities for improving image characteristics such as contrast.

To illustrate the methods of the present invention, the description in this section is directed to chest x-rays in one embodiment. However, the method of the present invention is not limited to any one type of radiological image, but can be used for imaging other parts of the body.

Figure 1:
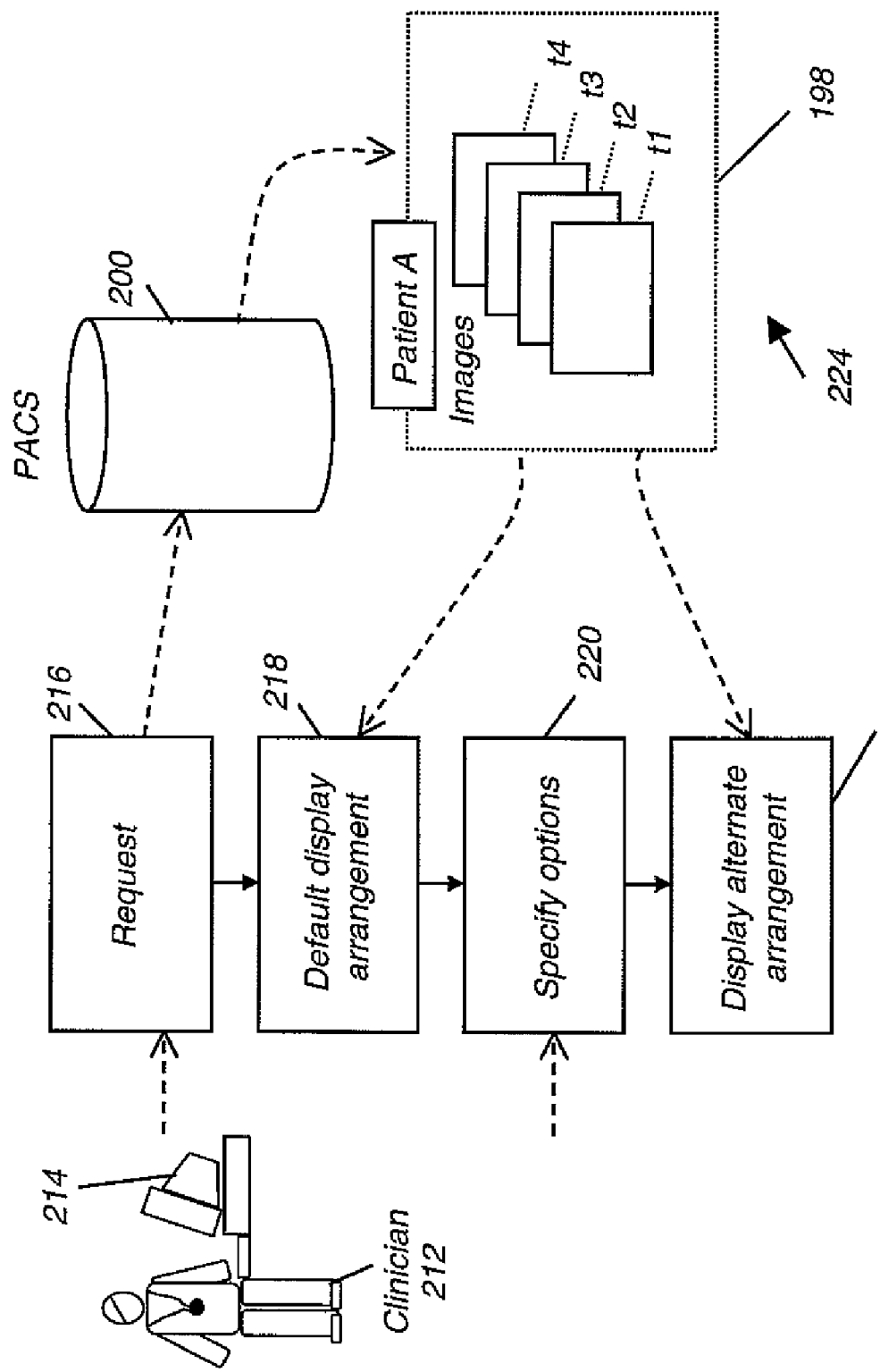
FIG. 1 is a block diagram of a medical imaging system in which the method of the present invention can be used.

Referring to FIG. 1, there is shown a block diagram with the basic processes and data that can be used to provide consistent rendering and to provide the capability for obtaining a chronologically arranged information set according to one embodiment. A clinician 212 at a workstation 214 enters a request 216 for image sequences and other historical information relating to a patient. Request 216 goes to PACS system 200, typically in the form of a DICOM worklist. The PACS system responds by providing image and other data stored for the patient represented generally as patient data 224 and typically provided in the form of a structured record (SR), such as ICU/SR 198 or similar DICOM-compliant record. Patient data 224 can include, for example, image data taken at different times t1, t2, t3, . . . tn. PACS system 200 provides a default display arrangement 218 that specifies an image presentation format and layout in a standard format. Clinician 212 can enter specific options, with an option instruction 220 for alternate arrangements of displayed images and data, typically using a predetermined format. For example, for lung imaging, a standard radiologist-preferred arrangement or "hanging protocol" showing different views in a certain layout order may be used as the default. However, an alternate hanging protocol may be preferred by an individual radiologist or for certain types of cases. In response to a command from clinician 212, a display alternate arrangement instruction 222 can be executed. This command may simply be entered using conventional windowing management utilities, using a mouse or other pointer, with techniques generally familiar to users of personal computers.

Figure 2:
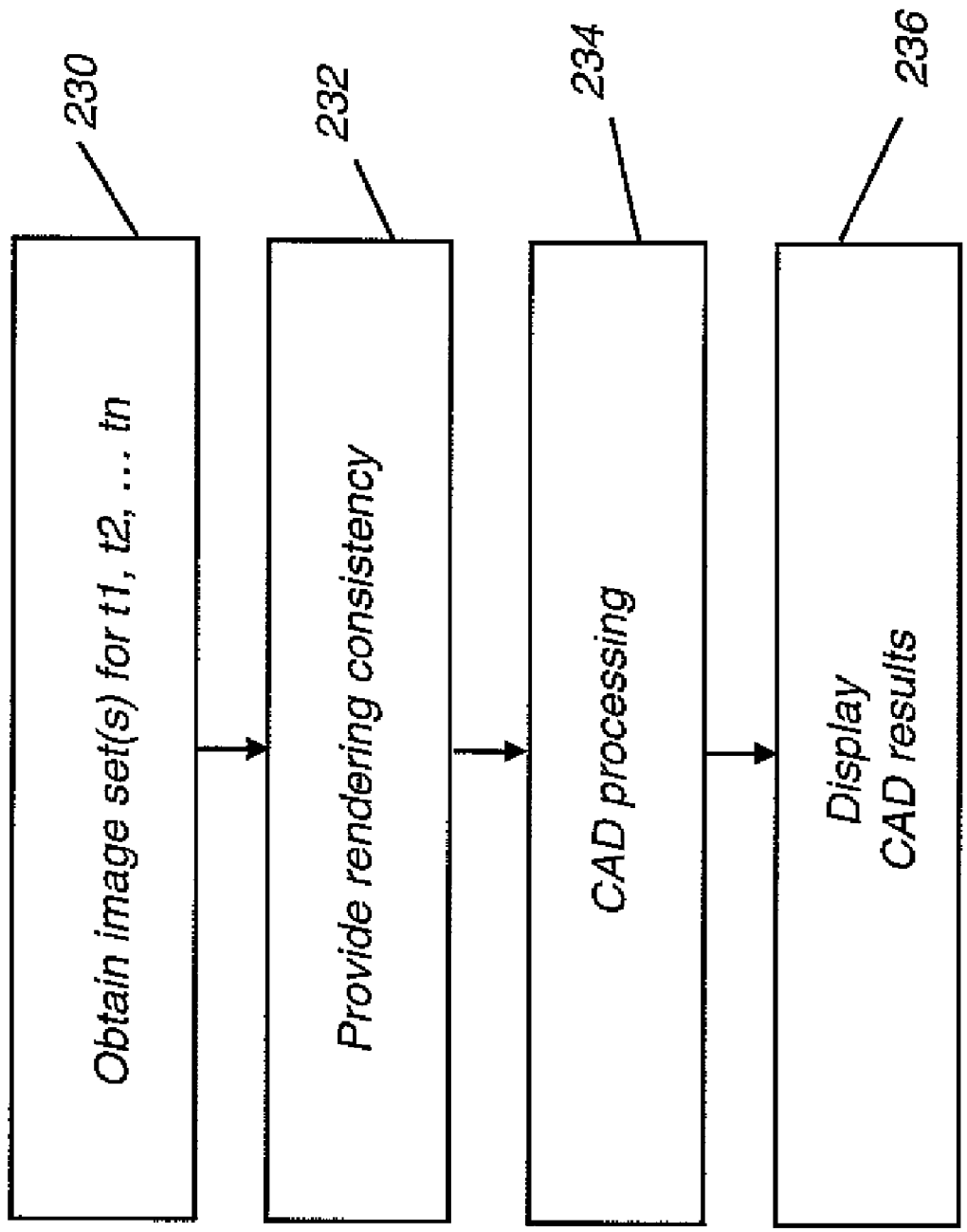
FIG. 2 is a logic flow diagram showing how the method of the present invention serves the broader requirements for CAD processing.

FIG. 2 is a block diagram showing key steps of the overall process for displaying chronologically arranged image data, as carried out by the system of the present invention. In an obtain image sets step 230, the system obtains from the PACS system multiple image sets taken at different times t1, t2, . . . tn. A rendering consistency step 232 uses image processing utilities for consistent presentation of images that may be taken at different times, but are of substantially the same body tissue, in a consistent manner. Thus, for example, two lung images taken on different days or under slightly different conditions may exhibit different contrast ranges. Consistent rendering utilities attempt to adjust the contrast of one or more images in order to allow them to be comparable with the presentation of images taken at different times.

An optional CAD processing step 234 may be executed in order to run various CAD algorithms on any of the images obtained for the patient. One advantage of this arrangement is that CAD algorithm results can be compared and the results of this comparison provided to help identify a problem area within an identified Region Of Interest (ROI). That is, for two or more images obtained from substantially the same body tissue but taken at different times, CAD algorithm results can be compared to highlight particular problem areas to the clinician, including rapidly developing conditions. In one embodiment, CAD processing is performed on two or more images, each image having been taken at a separate time t1 or t2, respectively. In comparing CAD results, an abrupt change in characteristics of a portion of tissue may help to highlight progress of a disease condition or treatment. Such an abrupt change, for example, may be reported by positioning a marker on a displayed image or using some other mechanism that is commonly employed by CAD systems.

It is instructive to note that earlier CAD results can be saved, but need not be saved, particularly where they do not show information of particular interest. CAD routines can be re-run on earlier as well as on later images, allowing a particularly useful tool for assessing growth rate or eliminating dormant or benign tissue from consideration. A CAD results display step 236 then follows the optional CAD processing step 234, again with the option for running CAD algorithms on previous images.

Figure 3:
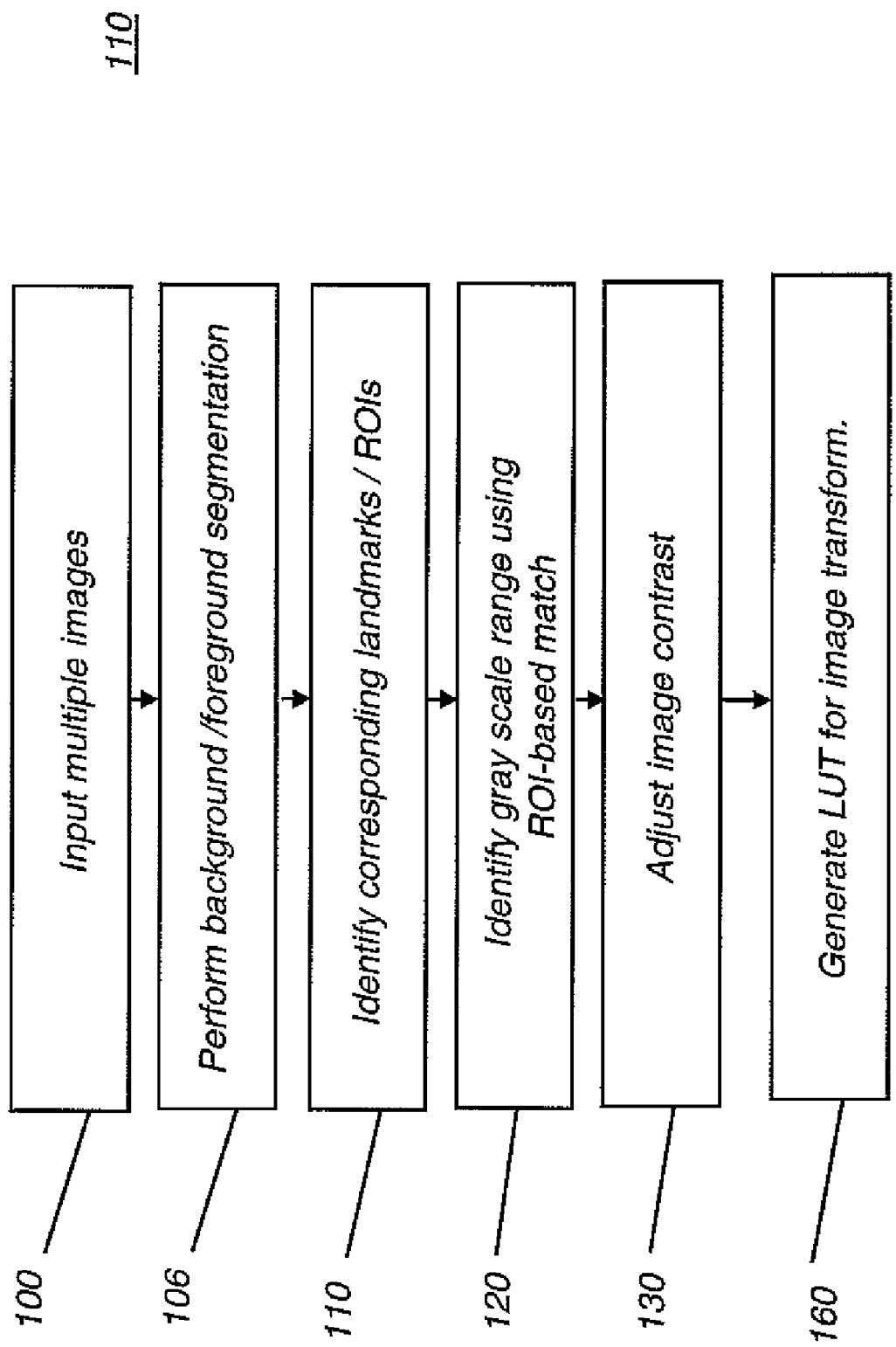
FIG. 3 is a logic flow diagram showing steps for obtaining image consistency according to the present invention.

The logic flow chart of FIG. 3 shows, in broad outline, the basic sequence of steps that are used to provide consistent rendering in one embodiment. Subsequent, more detailed description then expands; on the functions and operations executed within each step. In an initial step 100, two or more images are input to the logic processor or system that executes the image consistency logic. A segmentation step 106 provides a background segmentation technique for handling images having different amounts of background content (or no background content). A landmark identification step 110 follows, in which ROIs and other features on the two or more images are located, allowing spatial correlation between the images. A gray scale range selection step 120, at the core of the present invention, identifies a suitable gray scale range for providing the two or more images with a consistent presentation. A contrast adjustment step 130 performs one key operation for consistent rendering, namely, re-mapping of image pixel values over the region of interest (ROI), based on results of gray scale range selection step 120 and based on known landmarks in the image. This includes toe-shoulder contrast adjustment that adjusts the image content for very dark and very light regions. Finally, in an LUT generation step 160, Look-Up Tables (LUTs) are generated for each of the images submitted in initial step 100.

Background Segmentation

Background segmentation, executed in segmentation step 106 as shown in FIG. 3, enables the image tissue content to be identified and separated from background content, so that both types of image content can be handled separately. There are a number of approaches to background segmentation, well known to those skilled in the imaging arts. The following description gives procedures used in one exemplary embodiment, for a background segmentation method that is particularly well suited for chest x-ray imaging.

Figure 4B:
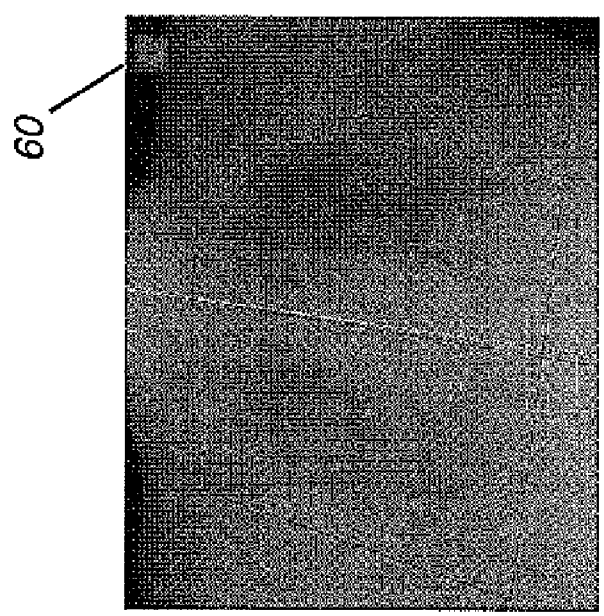
FIG. 4B is an image from which the histogram of FIG. 4A has been generated.
Figure 4A:
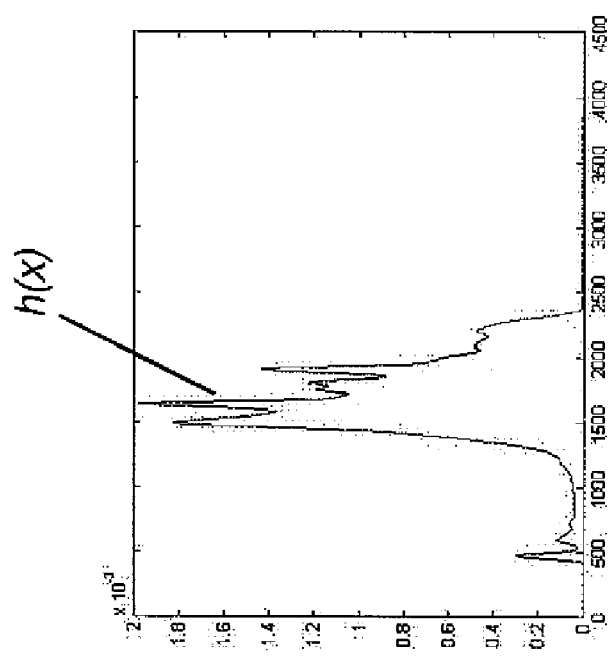
FIG. 4A is an example histogram for a diagnostic image.
Figure 4D:
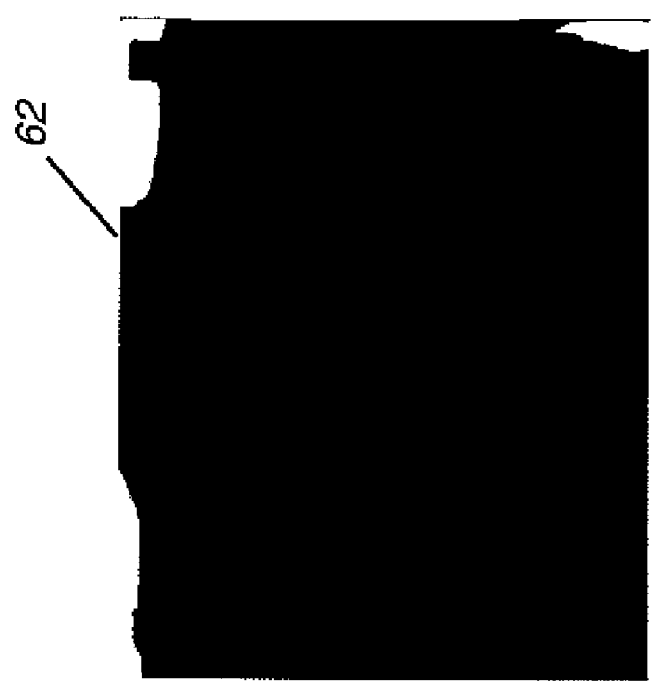
FIG. 4D is a mask for background segmentation in one example.
Figure 4C:
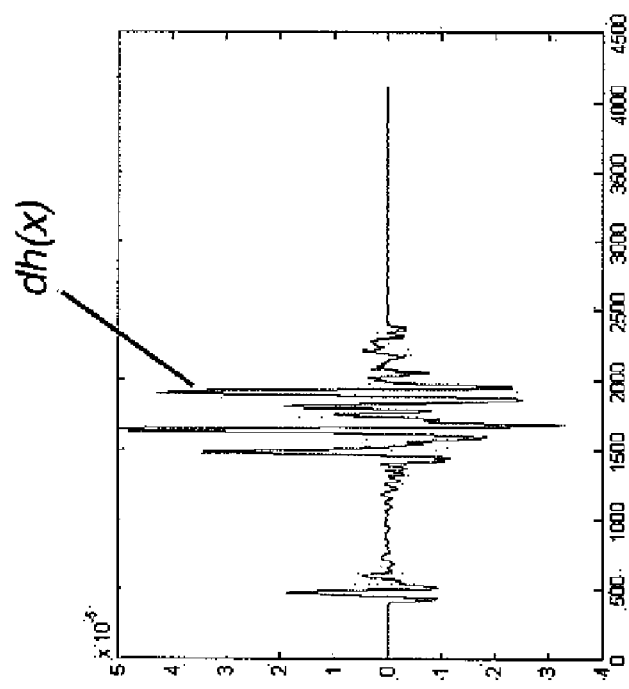
FIG. 4C is a difference histogram obtained from the image of FIG. 4B.

In this embodiment, histogram analysis and manipulation is used as a utility for background segmentation. FIG. 4A shows a histogram h(x) and FIG. 4B shows the corresponding original x-ray image 60 from which histogram h(x) is extracted. Among various techniques well-known to those skilled in the imaging arts is histogram smoothing, which can be used to reduce noise, for example. FIG. 4C shows a difference histogram dh(x) that can be obtained by subtracting a smoothed histogram from the original histogram h(x). FIG. 4D shows a mask 62 that can be generated using background segmentation techniques such as those described herein. Mask 62 distinguishes the segmented tissue region of the image from the background. The overall goal of background segmentation is to define the tissue portion of the image, such as that defined by the outline of mask 62 in FIG. 4D. A threshold image data value typically serves to identify the outline of mask 62. Density values above (darker than) a threshold value are considered to be background values. Image processing operations such as erosion and dilation are used to remove holes and smooth and define the area and outline of mask 62 more completely.

For chest x-rays, as well as for other types of radiological images, background segmentation distinguishes between various image characteristics. Some images, for example, may not have background content; in other images, the amount of background content may or may not be significant. FIGS. 5A through 5D show four typical cases for background content. For convenient reference in the following description, these cases are classified as the following Types, each type having a characteristic distribution from its corresponding histogram h(x):

Type I: No background. In the example of FIG. 5A, an image 60a has no background content. As its histogram h(x) clearly shows, all values for image 60a are clustered within a well-defined density range.

Type II. Background, but without a distinct background peak value. In the example of FIG. 5B, an image 60b has some background content. However, there is no well-defined peak value for the background data.

Figure 5C:
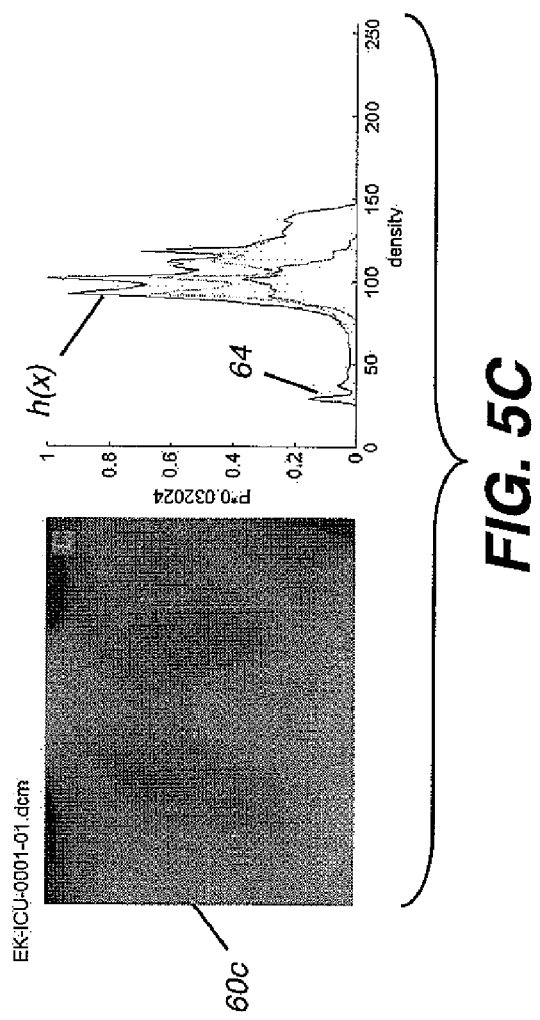

Type III. Background, having a background peak value and lower values between the background peak value and the values of pixels that provide the tissue image content. In the example of FIG. 5C, an image 60c has a well defined peak 64 in the background region.

Figure 5D:
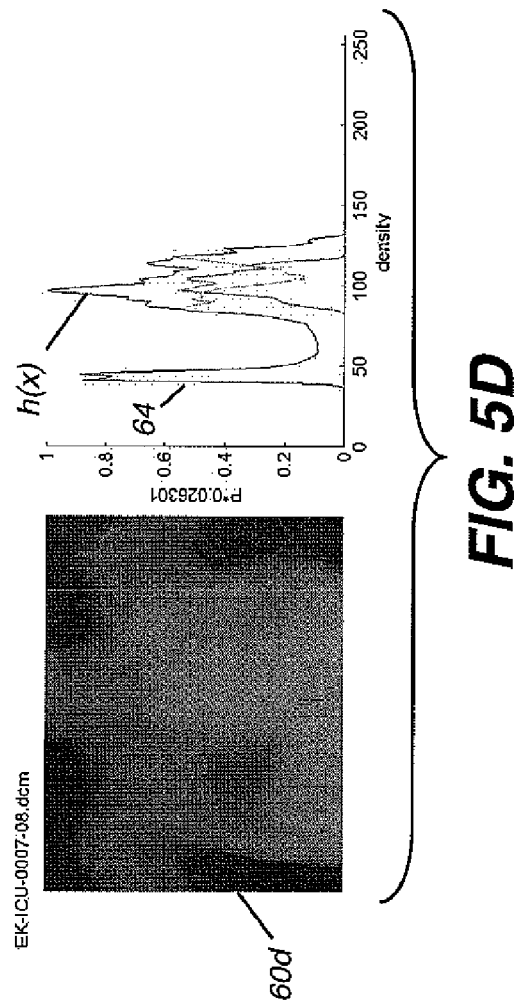

Type IV. Background, having a peak value and a higher "valley" between the background peak and tissue content, such that there is a clear separation between the background and the tissue content. In the example of FIG. 5D, an image 60d shows these characteristics.

Figure 6:
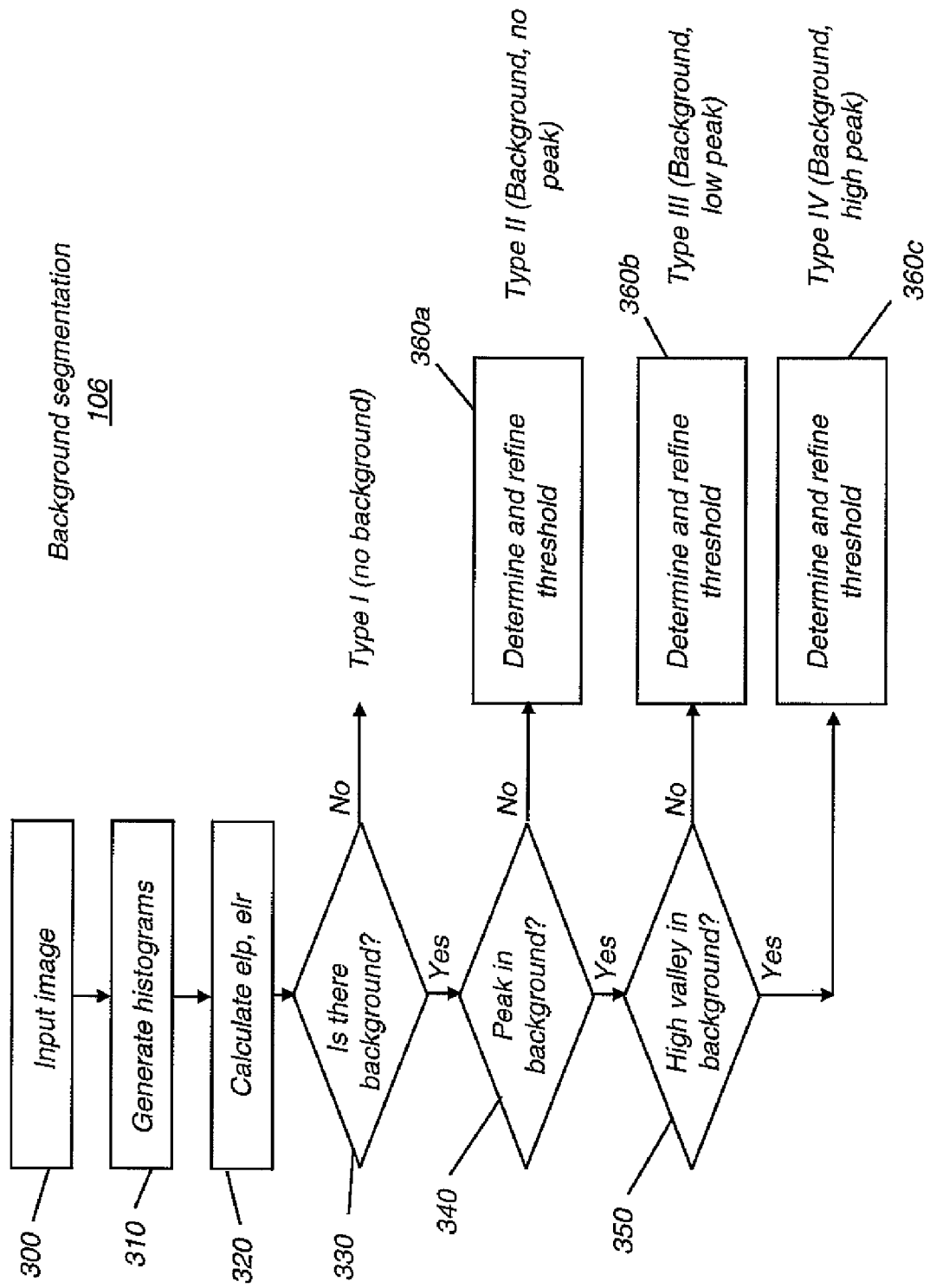
FIG. 6 is a logic flow diagram showing the steps and procedures used for background segmentation according to one embodiment.

Referring back to FIG. 3, background segmentation step 106 sorts through each histogram h(x), determine its overall Type (I, II, III, or IV), and determine a threshold value for background segmentation based on this assessment. The logic flow diagram of FIG. 6 shows the basic procedures performed as part of background segmentation step 106.

In an input step 300, an image is provided for this process. A histogram generation step 310 follows, during which the corresponding histogram h(x) for the image is extracted. In addition, a smoothed histogram sh(x) is also generated. Difference histogram dh(x) can then be generated, using the repeated subtraction for each histogram value x:

$$dh(x)=h(x)-sh(x)$$

Next, a bounds calculation step 320 is executed, in order to determine the approximate bounds of the image area with respect to the histogram h(x). Bounds calculation step 320 identifies an effective left point elp and an effective right point erp that bound the image content. Locations of these points are shown, for one example image, in FIG. 9. In one embodiment, the effective left point elp and an effective right point erp are obtained using image activity analysis as described in the '511 Lee et al. patent cited earlier.

Alternately, the effective left point elp can be obtained from the difference histogram dh(x). As was shown in FIG. 4C, difference histogram dh(x) has a peak value that corresponds to the peak value of the histogram h(x) from which it is derived (FIG. 4A). Moving from this peak value, or from the extreme left of the difference histogram dh(x) where there is no peak value, the elp is the first grayscale value satisfying certain conditions. First of all, a predetermined number of sequential ordinate x values is identified, where each x value has at least more than an empirically determined number of pixels. In one chest x-ray embodiment, for example, a sequence of ten x values is identified where each value in the sequence has more than 20 pixels. When this is satisfied, the tenth pixel in this sequence (again, moving from the left) can be considered as the elp. It will be recognized by those skilled in the imaging arts that this type of method limits the impact of noise on selection of the elp.

Effective right point erp determination can be similarly performed, this time working from the extreme right of difference histogram dh(x). A predetermined number of sequential ordinate x values is identified, where each x value has at least more than an empirically determined number of pixels. In one chest x-ray embodiment, for example, a sequence of ten x values is identified where each value in the sequence has more than 20 pixels. When this is satisfied, the tenth pixel in this sequence (this time counting from the right) can be considered as the erp.

Once elp and erp are identified, a bounded histogram can be formed, so that generally those values bounded within values elp and erp are considered. The overall Type characteristic of the radiological image can be determined from this bounded histogram, according to the Type I-IV classification described earlier. In a first classification step 330, a process is used to determine whether or not there is any background. Where there is no background content in the image, the image can be classified as Type I. No threshold calculation is needed for a Type I image.

In a subsequent classification step 340, a peak vale can be identified within some interval of the elp (such as, for example, within 400 code values to the right of the elp). In one embodiment, detection of a value that lies within approximately 0.15 of the peak value of histogram h(x) indicates a peak 64 in the background content. Where there is no such peak, the image can then be classified as being of Type II. A threshold calculation step 360a can then be used to identify a threshold value for background segmentation.

Where a peak value has been identified, a classification step 350 is then executed in order to differentiate between Type III and Type IV images. In one embodiment, empirical values are used in metrics that determine whether or not peak 64 has sufficient height for Type IV classification and whether or not values in the vicinity of peak 64 are sufficiently high for Type IV classification. Corresponding threshold calculation steps 360b and 360c are then used in order to obtain suitable threshold values for background segmentation based on the results of classification step 350.

Threshold calculation steps 360a, 360b, and 360c can determine suitable threshold values in a number of ways. In one embodiment, empirical data are used to generate threshold values in threshold calculation step 360a uses a percentage value of the peak value from h(x) and searches from the elp moving rightward until this value is reached. Then bounded histogram h(x) values below this value are considered to be background. Other threshold calculation steps 360b and 360c may be more complex, computing their results differently or measuring the height of h(x) from different points between the background peak and the histogram peak.

Other background segmentation methods can be used for the purposes of the present invention. For example, the segmentation method disclosed in commonly assigned U.S. Patent Application Publication No. 2004/0109594 entitled "Method for Automatic Construction of 2D Statistical Shape Model for the Lung Regions" by Luo et al. can alternativey be used for background segmentation step 106.

Identification of Landmarks and ROIs

Landmark identification step 110 in the logic flow diagram of FIG. 3 uses one of various methods to identify various features that allow two or more images to be correlated. In one embodiment, for example, the method used is similar to that disclosed in commonly assigned U.S. Patent Application Publication No. 2004/0109594 entitled "Method for Automatic Construction of 2D Statistical Shape Model for the Lung Regions" by Luo et al. Briefly, this method applies thresholding, template, and edge gradient analysis to detect the boundaries in an image, such as lung boundaries, for example.

Figure 7:
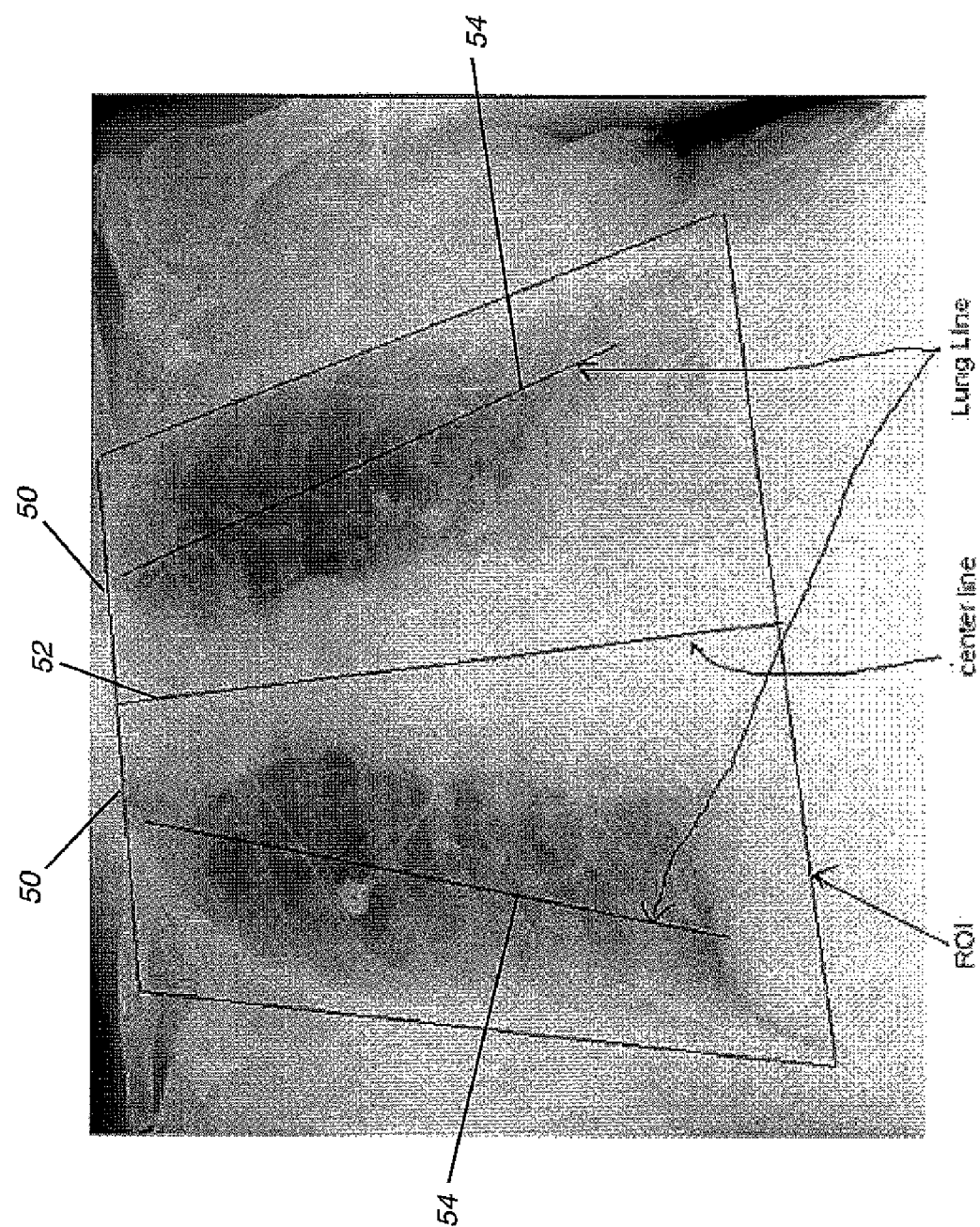
FIG. 7 is a plan view of a chest x-ray image having regions of interest (ROIs) surrounded by other tissue structures.

Another embodiment applies feature identification algorithms to locate key features in an image and to allow correlation of two or more images accordingly. FIG. 7 shows a chest x-ray image with two Regions of Interest (ROIs) 50 identified.

Figure 8:
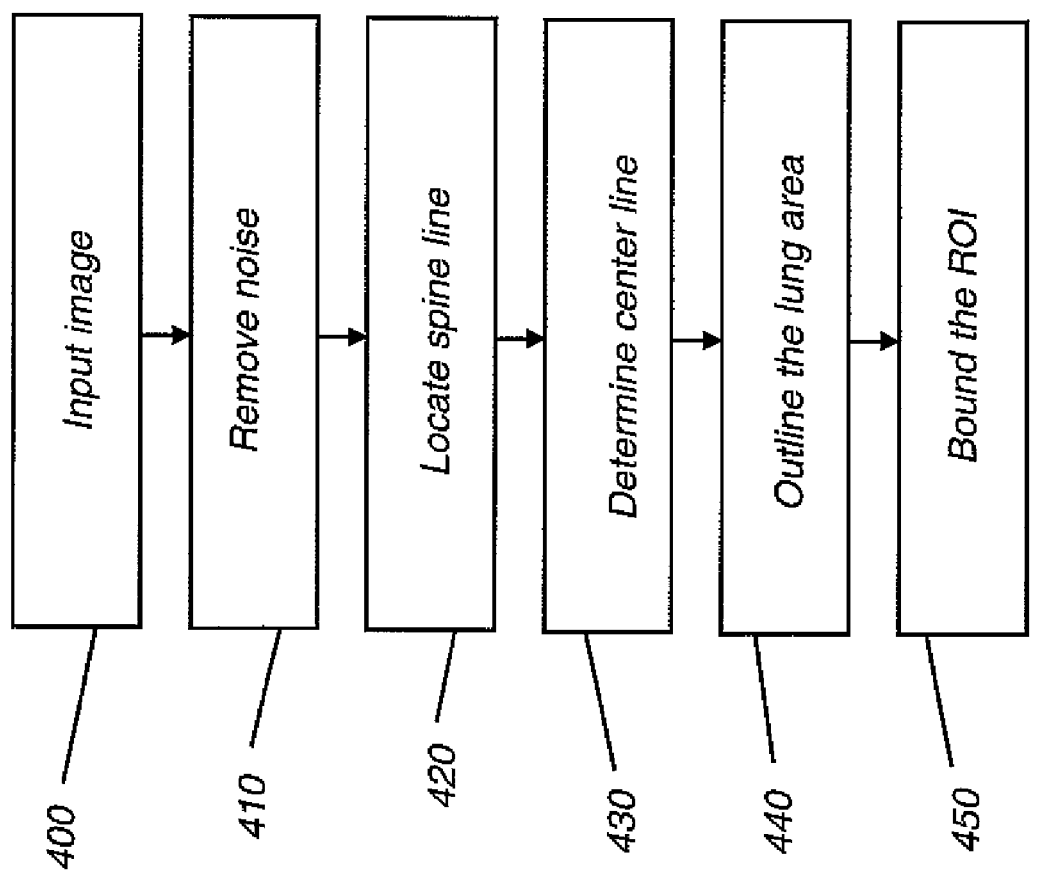
FIG. 8 is a logic flow diagram outlining the basic steps used for ROI identification in one embodiment.

ROI identification can have a number of variables, depending on the type of image that is obtained. The logic flow diagram of FIG. 8 shows the basic steps for ROI identification in landmark identification step 110 in one embodiment.

Following background segmentation as described earlier, each image is provided for landmark/ROI identification processing in an input step 400. A noise removal step 410 provides rudimentary noise removal procedures, using techniques well known in the imaging arts. Next, a location step 120 is executed to determine the location of key features. For chest x-rays, as in the embodiment described herein, location step 420 is directed to locating the spine of the patient. In one embodiment, this is done by first locating the maximum grayscale values (the brightest values) for each row of the chest x-ray image. Then, the center line of the spine can be determined by locating the highest value in each row and connecting these points, one to the next followed by a line fitting.

Alternately, a columnar approach can be used. Here, a mean column gray level is obtained for each column. The highest gray level value will indicate the column that is most properly centered on the spine. Then, over a given thickness distance d, obtain the highest pixel values for two rows disposed away from the edges, one toward the bottom of the image and one toward the top. Connect these pixel values to obtain a center line 52 for the spine, as shown in FIG. 7. With the approximate center of the spine thus determined, a centerline computation step 430 for each lung can be executed. This is performed by finding the lowest density (darkest) pixel in the row, or the averaged lowest grayscale value in each row, to each side of center line 52. Center line 52 of the spine can be helpful in determining the approximate angle of the lungs for making these measurements. Lung lines 54 can then be formed by connecting these high-density points. An outline step 440 then helps to identify the ROI more closely. An iterate line fitting method, based on low grayscale values for pixels in the vicinity of lung lines 54, allows tracing of the lung structure. Boundary points for the lungs can be obtained using one or more central rows in the image and based on grayscale values in moving along central rows, in each direction right and left of each lung line 54. A bound step 450 then provides bounding geometry for defining the lung area as ROI 50.

It may alternately be desirable to form a mask for isolating the spine or other structures from the image. FIG. 16 shows a spine mask 66 provided to assist in further segmentation of the image prior to identifying the ROIs.

Figure 9:
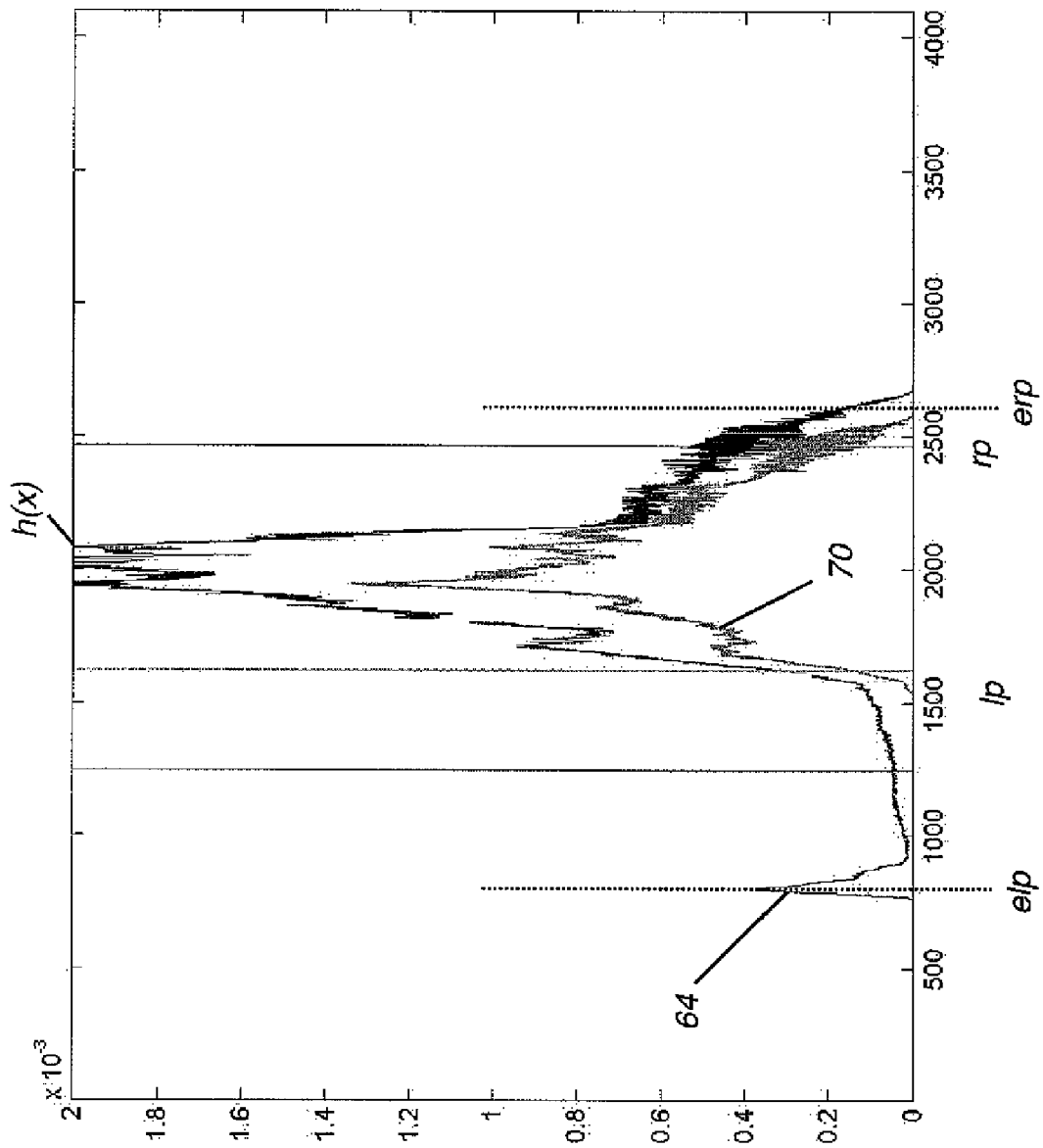
FIG. 9 is a histogram showing key points used for determining the image Type in one embodiment.

Referring back to FIG. 3, once one or more ROIs 50 have been identified, gray scale selection step 120 can be executed. This identifies the primary area of the image and enables the generation of histogram data that relates to the ROI. Referring back to FIG. 9, points lp and rp represent left and right points, respectively, of the histogram data that corresponds to ROIs 50. This data is defined within a primary area 70 as is shown in FIG. 9.

Identifying and Adjusting the Gray Scale Range—Value Ar Calculation

The remapping of image pixel values within the region of interest is carried out in gray scale range selection step 120 and contrast adjustment step 130 in the logic flow diagram of FIG. 1.

Figure 13:
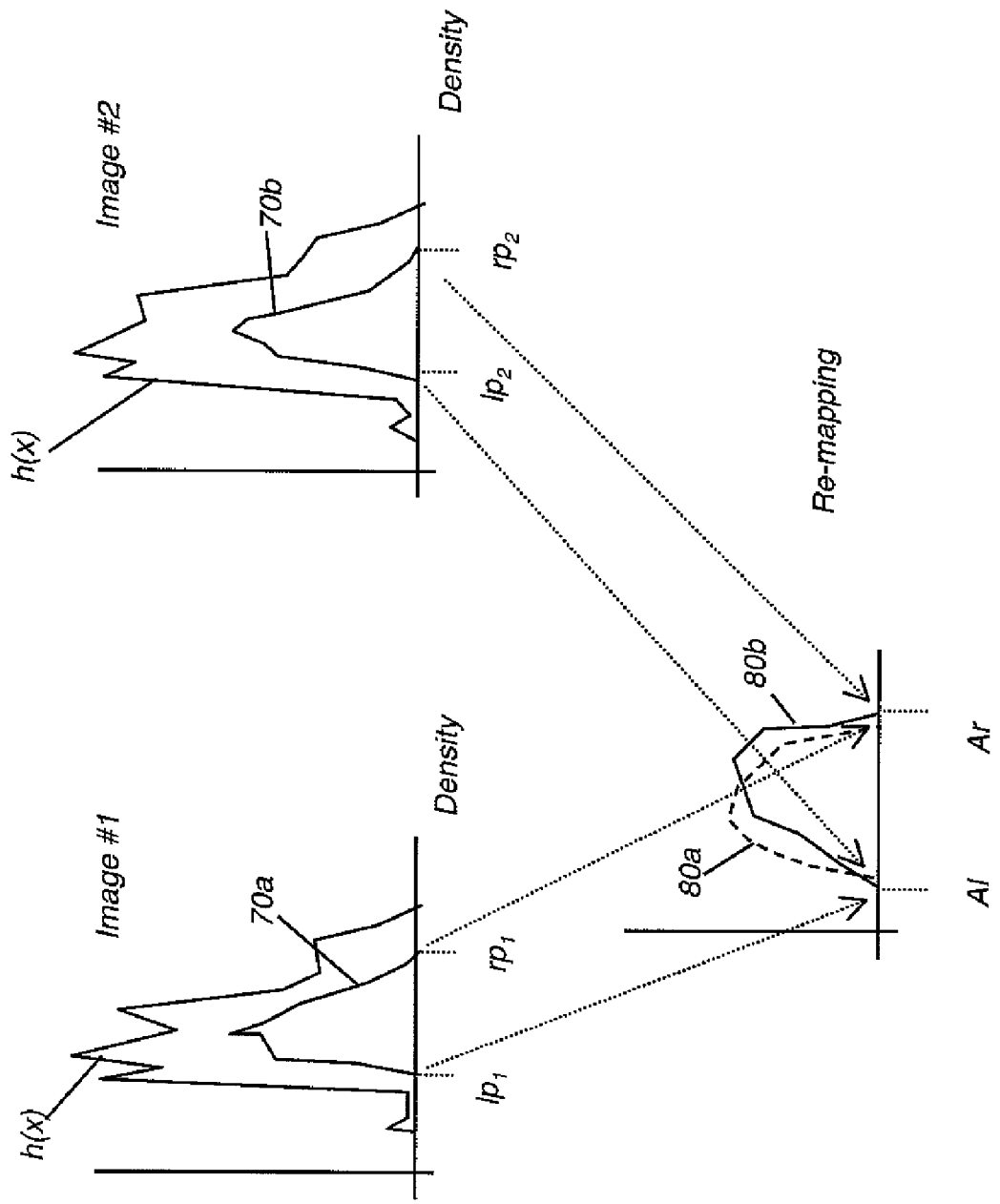
FIG. 13 shows the remapping operation performed by the present invention.
Figure 14B:
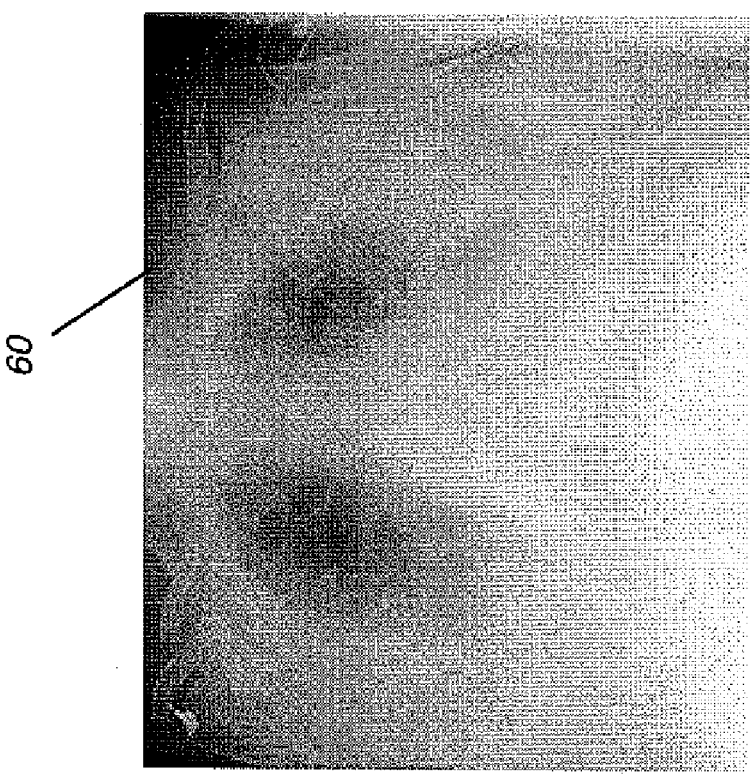
FIGS. 14A and 14B show, for comparison, an image before and after rendering using the method of the present invention.
Figure 14A:

FIG. 13 shows the re-mapping scheme that is used for image data for two or more images, according to the present invention. For each of images #1 and #2, a primary area 70a, 70b is identified, using the procedures for background segmentation and ROI identification just described. Left points lp1, lp2 and right points rp1, rp2, respectively, are obtained for the images following ROI identification. The goal of these next few steps is then to remap left points lp1, lp2 and right points rp1, rp2 to corresponding points Al and Ar for forming consistent images. The lp1 and lp2 could be the leftmost points of 70a and 70b or the points beyond which lie no more than about 5% of the total area under curves 70a and 70b on the left side, respectively. The rp1 and rp2 could be the rightmost points of 70a and 70b or the points beyond which lie no more than about 5% of the total area under curves 70a and 70b on the right side, respectively.

FIG. 13 illustrates a key principle. As part of the transformation between left points lp1, lp2 and right points rp1, rp2 and their corresponding Al, Ar, the range of the input data values is usually increased or "stretched". This adjustment is performed as part of contrast adjustment step 130. Adjusted primaries 80a and 80b indicate this transformed area, occupying more space in the histogram. It is instructive to note that primaries 80a and 80b are very similar, but typically exhibit slight differences, related to slight differences in image content and conditions.

It is noted that FIG. 13 simplifies the re-mapping scheme slightly, since the Al and Ar points may vary slightly between the two images, as described in more detail below.

Figure 10:
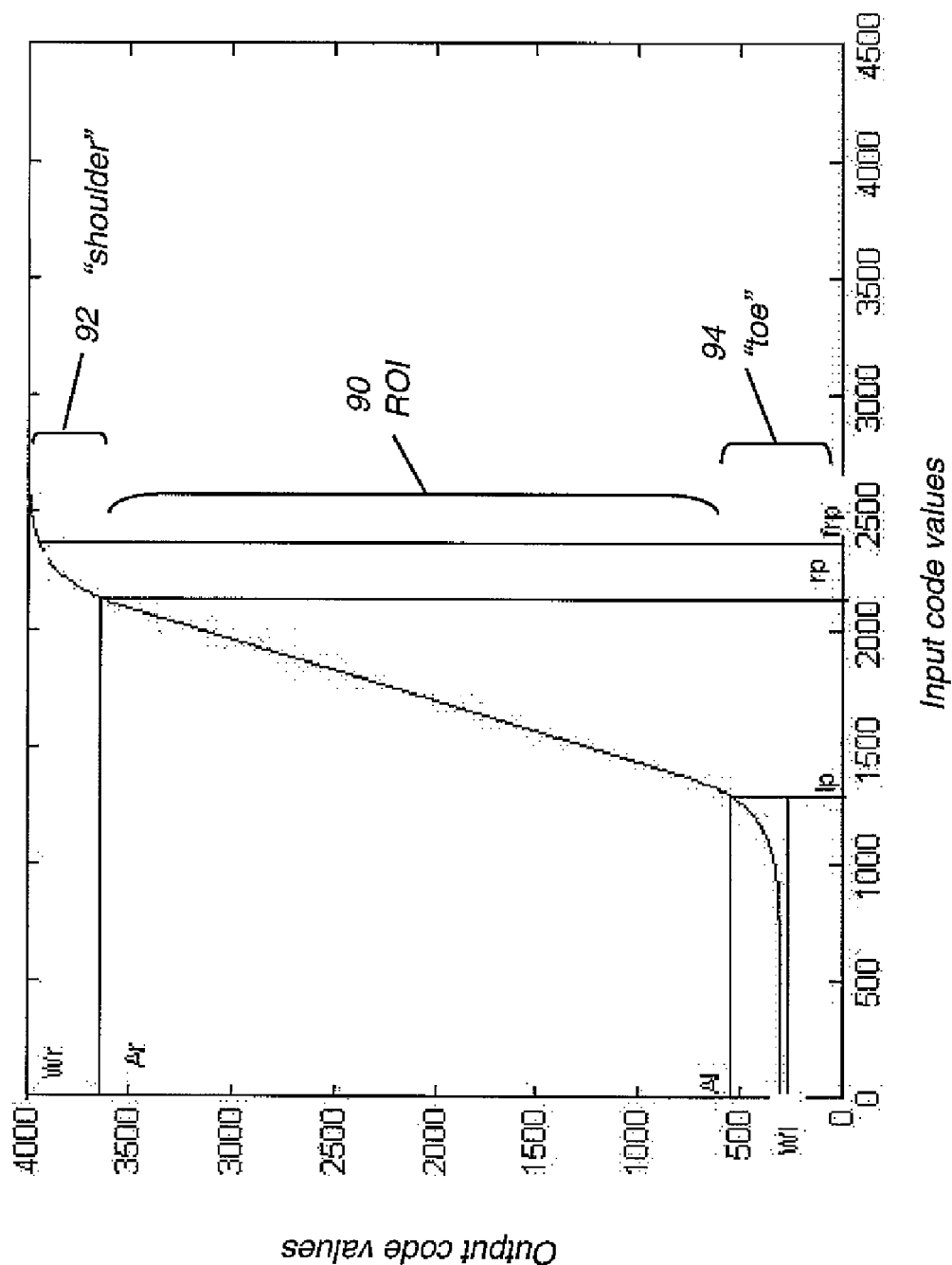
FIG. 10 is a graph showing input to output mapping for an image using the method of the present invention.
Figure 17B:
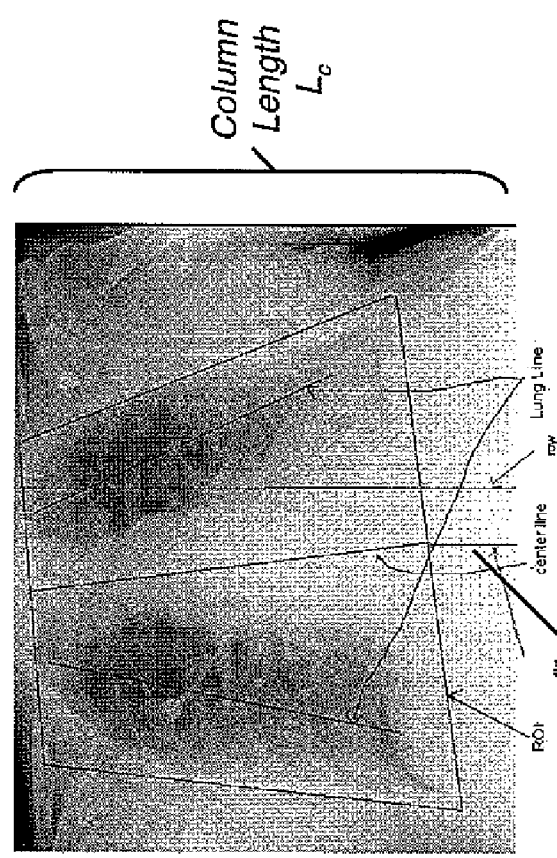
FIGS. 17A and 17B show two images of the same patient, but having different center.
Figure 17A:
Figure 18:
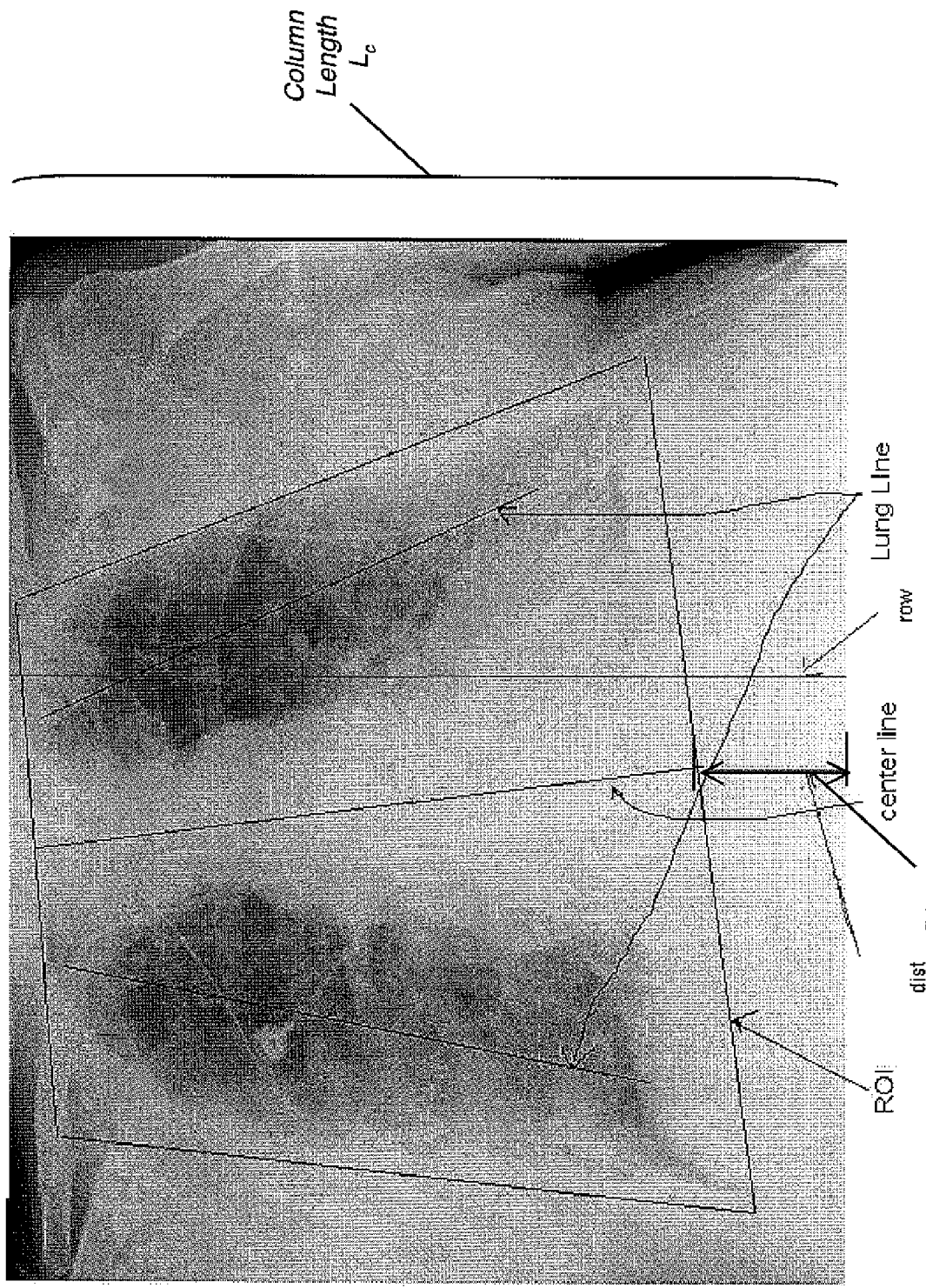
FIG. 18 shows dimensional values that can be used to help provide consistency for images centered differently.

The graph of FIG. 10 shows how the various portions of the image are remapped for consistent rendering and the relative position of values Ar and Al in the remapping. Value Ar can be calculated in a number of ways. In one straightforward embodiment, right point rp obtained from the ROI can be mapped to a value Ar that has been determined to be a practical value for a set of images of the same type and from the same patient. However, this approach may not adequately compensate for some differences between two images, particularly as relates to the relative location of the center of the image. For example, FIGS. 17A and 17B show two images of the same patient, but having a relatively different center. Here, FIG. 17B has a higher percentage of the abdomen than does FIG. 17A, in which the lung area is centered slightly lower in the image and where the image shows other differences due to different patient's positioning, imaging techniques, and patient's aspiration condition. Obtaining consistent image processing treatment for both of these images may not be achievable without additional compensation for this slight centering difference. That is, for a location in the patient's anatomy, the distance d shown in FIGS. 17B and 18 may differ between the two images. This difference can be best expressed by means of a proportion of distance d to column length $L_c$ for each image.

Figure 19:
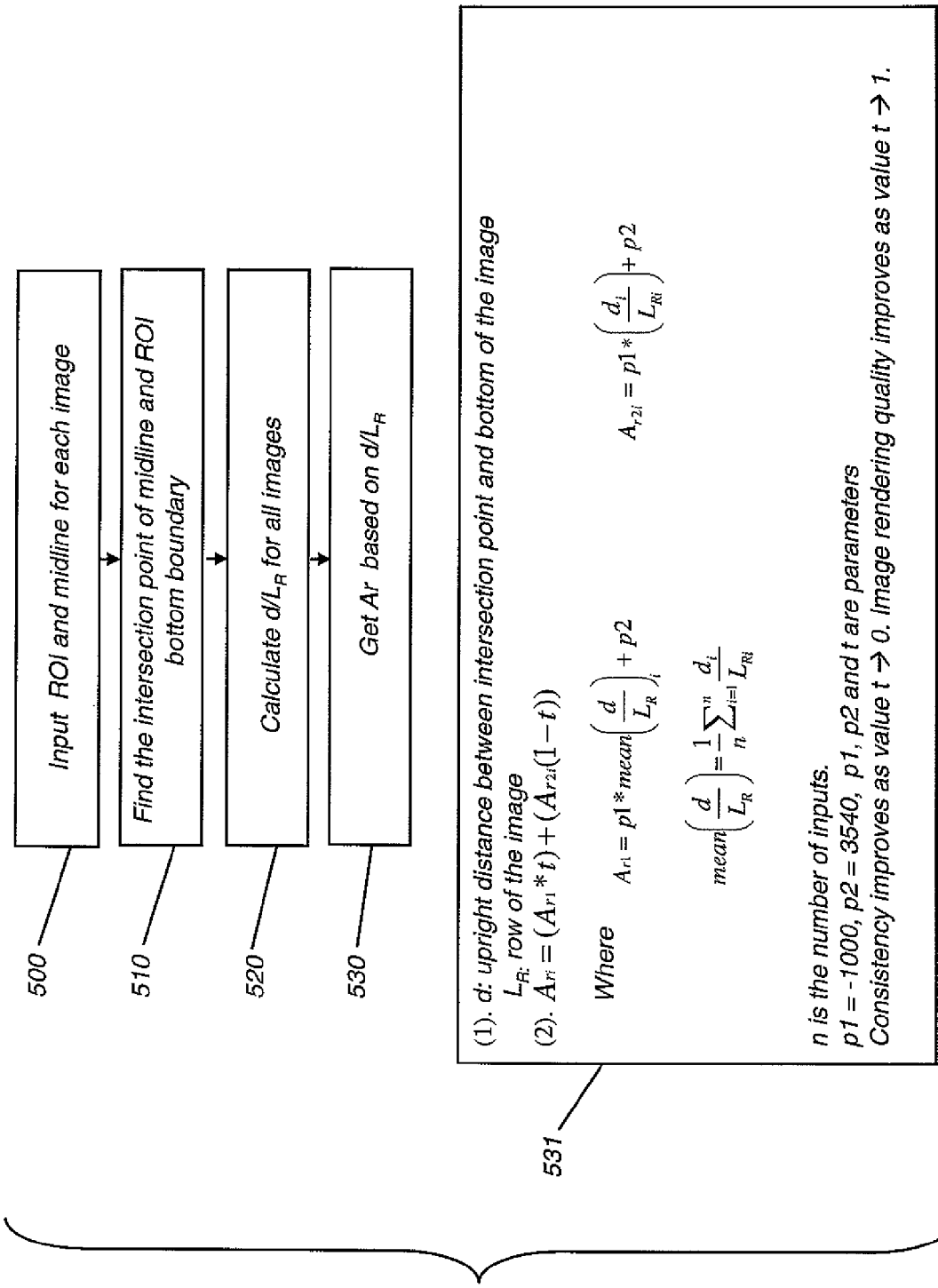
FIG. 19 is a logic flow diagram for computing an upper bound for remapping region of interest pixels in one embodiment.

The logic flow diagram of FIG. 19 shows how upper remapping value Ar can be computed for a set of two or more images in one embodiment. In an input step 500, the ROI and midline data information are obtained from procedures executed as part of landmark identification step 110, described earlier with reference to FIG. 3. An intersection locator step 510 then Finds the intersection point of the midline and the bottom ROI boundary. A proportion calculation step 520 calculates the value of distance d (FIG. 17B) divided by column length $L_R$ for all images in the set. An obtain Ar estimate step 530 is then executed, using calculations 531 shown in FIG. 19 and described subsequently.

Given these considerations, estimation of value Ar can be performed using the following calculations:

$$Ar1 = p1 * \text{mean}\left(\frac{d}{L_R}\right)_i + p2 \quad \text{(eq. 1)}$$

$$Ar2_i = p1 * \left(\frac{d_i}{L_{Ri}}\right) + p2 \quad \text{(eq. 2)}$$

$$Ar_i = (Ar1 * t) * (Ar2_i(1-t)) \quad \text{(eq. 3)}$$

$$\text{mean}\left(\frac{d}{L_R}\right)_i = \frac{1}{n}\sum_{i=1}^{n}\frac{d_i}{L_{Ri}} \quad \text{(eq. 4)}$$

wherein p1 and p2 are parameters;

Subscript i stands for each image in the set for normalization;

$Ar_i$ gives the remapping value of the rp value for image I;

$L_R$ is the number of rows in the ROI (this gives vertical distance);

Distance d and column length $L_{Ri}$ are as noted earlier; and $0 \leq t \leq 1$ is a weighting factor that can be adjusted based on the perceived variability among the set of images processed. When value t is close to 1, there may be little or no adjustment for individual images, due to the difference in the relative centering of the lung region. When value t is close to 0, value Ari is predominantly determined by the difference in centering from each image.

Identifying and Adjusting the Gray Scale Range—Value Al Calculation

Figure 20:
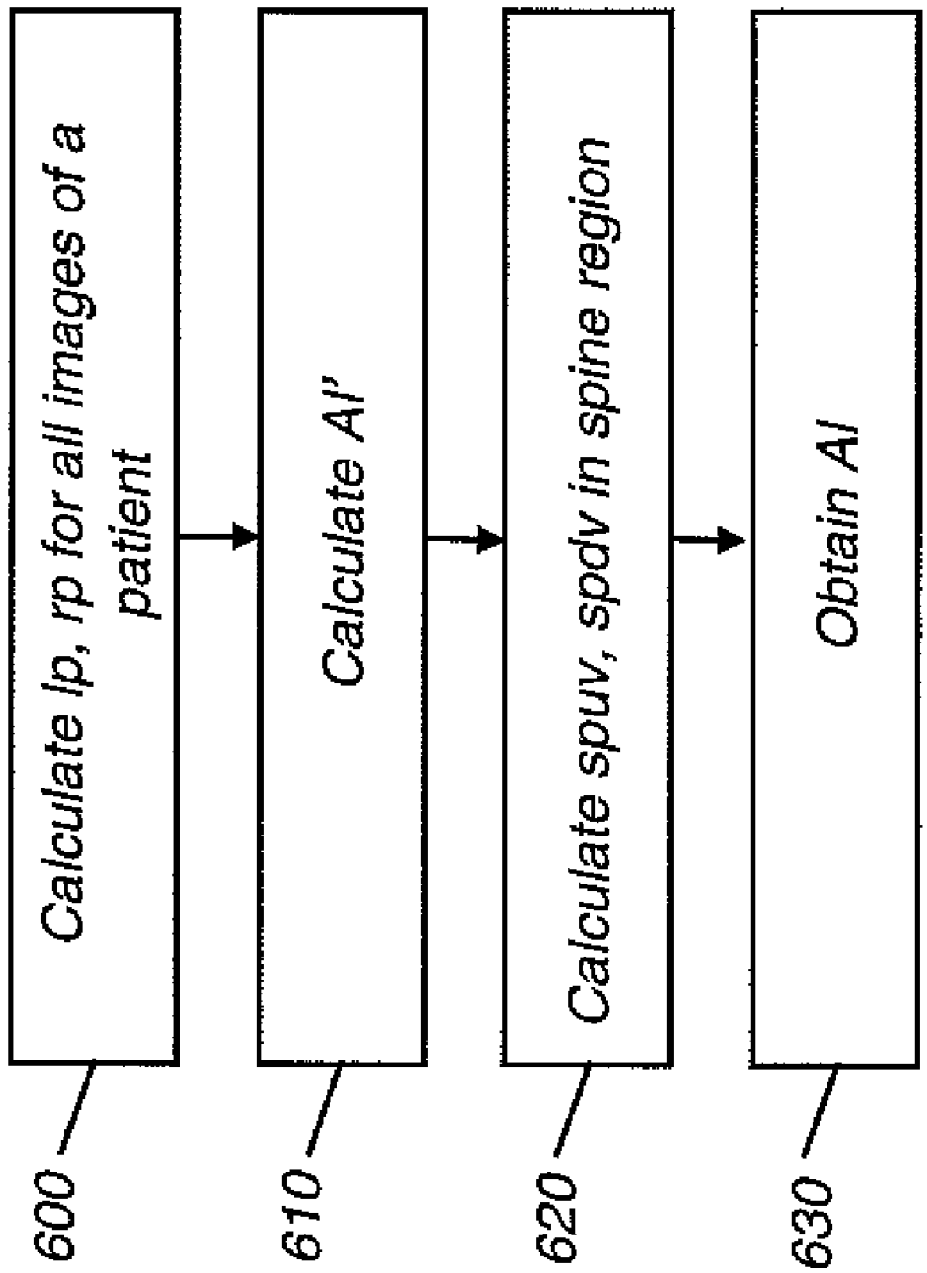
FIG. 20 is a logic flow diagram for computing a lower bound for remapping region of interest pixels in one embodiment.

Because of its diagnostic relevance, particularly with lung imaging, lower remapping value Al can be more difficult to calculate than upper remapping Ar. The logic flow diagram of FIG. 20 shows the basic steps that can be used for Al determination in one embodiment.

In a calculate step 600, the values of lp and rp are determined, where these are the lower and upper boundaries of the main gray-level range of the image ROI. These values are typically within the range 2%-95% for gray level values in the ROI.

The next step is the calculate Al' step 610. The interim value Al' is based on the ROI only; later calculations are performed to relate these values to the overall image. The value of Al' can be calculated as follows:

$$Al' = ax^2 + bx + c \quad \text{(eq. 5)}$$

wherein a, b, and c are empirically determined parameters; $x = \max(500, \min(1000, \overline{rp-lp}))$; and wherein $(\overline{rp-lp})$ is the average for every image in the set. This bounds x to within a range known empirically to be within the ROI.

The next step introduces factors provided from the spine region. A determine main range step 620 obtains upper and lower gray scale values that define the main gray-level range in the spine region. These are a lower value (spdv) and an upper value (spuv) that represent approximately the 10% to 80% range of gray value in the spine area of an image. These values are used to compute a normalization factor in a subsequent calculation. Other methods could alternately be used for computing a normalization factor, based on image attributes, as is well known in the image processing arts.

An obtain Al step 630 follows, in which the normalization information from the preceding step is used to compute Al from the interim value Al' that was computed earlier. The following calculations are used:

$$Al = Al' + \max(-250, \min(-300*(spdiffrlp-1.8), 250)) \quad \text{(eq. 6)}$$

$$Al = \max(400, \min(950, Al)) \quad \text{(eq. 7)}$$

wherein $$spdiffdrlp = \left(\frac{\overline{rp-lp}}{spdv-spuv}\right)$$

provides a normalization value.

Equation 7 sets some limits on the range of the normalized value obtained in Equation 6.

Constructing the LUT

Figure 21:
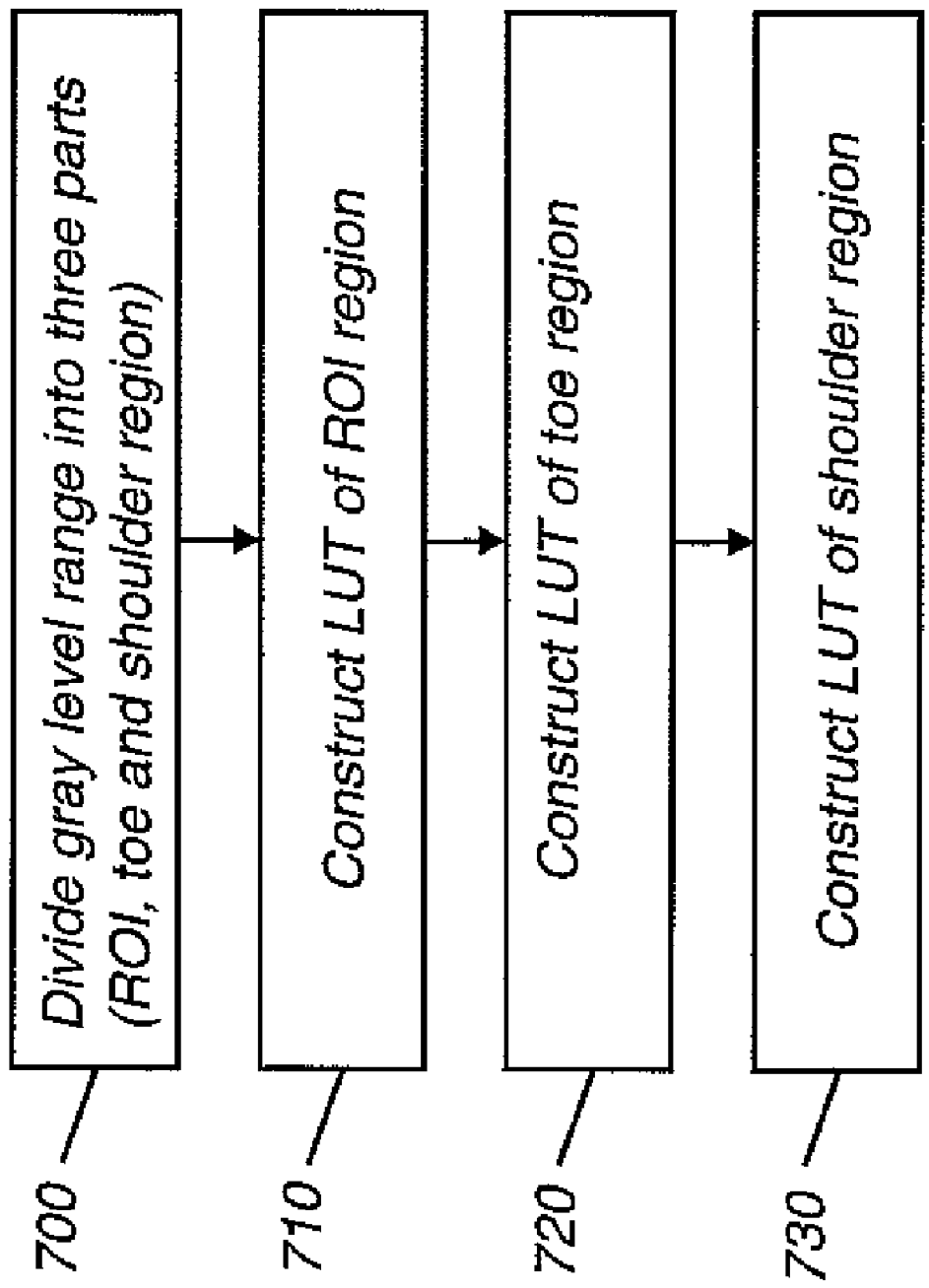
FIG. 21 is a logic flow diagram for look-up table construction procedures.

Once the Ar and Al values for mapping have been derived for an image, the LUT for its rendering can be generated. The logic flow diagram of FIG. 21 shows the overall steps used for this procedure. A gray level partitioning step 700 divides the gray scale range into the three parts shown in FIG. 10: a toe region 94, an ROI region 90, and a shoulder region 92. The subsequent procedures then generate LUT values for each of the three regions. An ROI region LUT construction step 710 is the most significant for diagnostic imaging and is described subsequently in more detail. A toe region LUT construction step 720 then calculates the LUT values for darker, fully exposed areas. Finally, a shoulder region LUT construction step 730 is executed for calculating values used in highlight regions.

Figure 22:
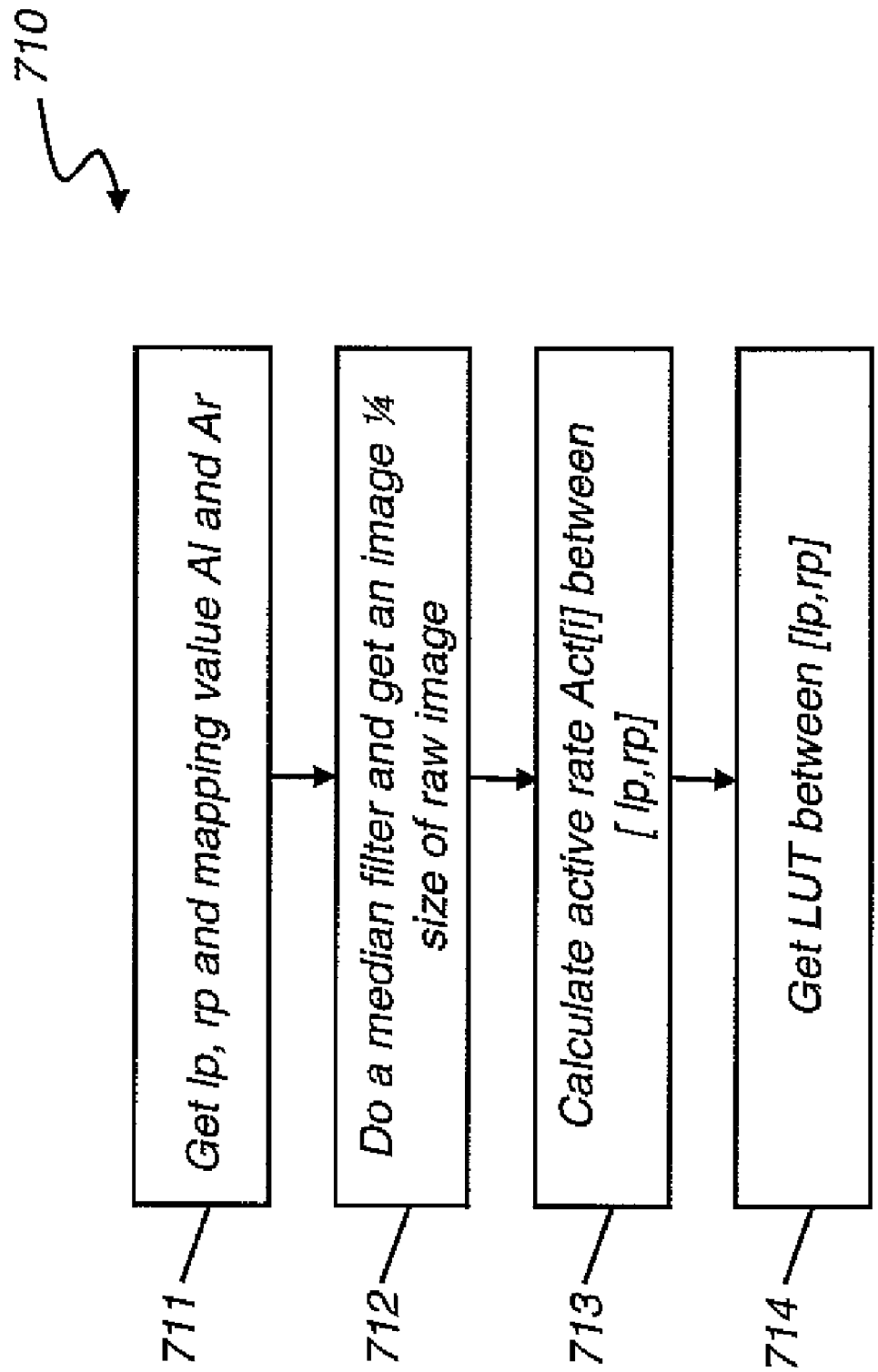
FIG. 22 is a logic flow diagram showing steps for generating a look-up table for the region of interest.

The logic flow diagram of FIG. 22 shows the sub-steps that are executed as part of ROI region LUT construction step 710.

An obtain values step 711 is first executed to obtain values of lp and rp from the original image and lower remapping value Al and upper remapping value Ar calculated for this image. Next, an image size reduction step 712 is executed. In this step, a median filter is applied to obtain a reduced size image, ¼ the size of the original image in one embodiment. This helps to speed calculation for the steps that follow.

An image activity determination step 713 is then executed, in which image activity within the ROI is evaluated. Areas of high image activity are often clinically significant. Thus, identifying such areas helps to provide suitable imaging treatment and to enable areas of higher activity to be adjusted so that detailed information is heightened, rather than lost. This procedure may use methods disclosed in the Lee et al. '511 patent cited earlier, for example. One embodiment employs the following basic sequence:

For every pixel (x0, y0)
Count, in its 7*7 region, the number of pixels which satisfy:

$$delta1 < |h(x,y) - h(x0,y0)| < delta2$$

wherein h(x,y) is the gray level of a point in the region; h(x0,y0) is the gray level of middle point in the region; delta1=K*(rp−lp); delta2=5K*(rp−lp); and
K is a variable parameter, empirically determined.
Then, two arrays can be obtained:
Num[4096], a histogram where each value gives the number of pixels at each gray level in the ROI; and
Act[4096], a histogram where each value gives the mean active number of the pixel at each gray level in the ROI.

These values are then used for generating the actual LUT values for ROI pixels in an LUT generation step 714. The following calculations are used:

$$Actnew[i] = \ln\left(\frac{\sum_{j=-11}^{11} Act[i+j] * Num[i+j]}{\sum_{j=-11}^{11} Num[i+j]} + 1\right) + 1 \quad (eq. 8)$$

$$ActNor[i] = \frac{Actnew[i]}{\sum_{i=lp}^{rp} Actnew[i]} \quad (eq. 9)$$

$$LUT(lp) = Al \quad (eq. 10)$$

$$LUT(i+1) = \quad (eq. 11)$$
$$LUT(i) + ActNor(i)(Ar - Al)ratio + \left(\frac{(Ar - Al)(1 - ratio)}{rp - lp}\right)$$

wherein i=lp . . . (rp−1)
0≦ratio≦1. In one embodiment, ratio=0.7.
LUT Mapping for Toe and Shoulder Regions In addition to remapping the ROI region of the image, shown as a region 90 in FIG. 10, the method of the present invention is also directed to mapping darker and lighter regions. Toe-shoulder contrast adjustment step 140 performs the additional mapping that is needed for dark regions, represented as a toe region 94 in the transformation curve in FIG. 10, and for light regions, represented as a shoulder region 92 in the transformation curve in FIG. 10. Using the nomenclature shown here, points to the left of lp are re-mapped to the so toe region between a lower value Wl and Al. Values darker than this region are not used. Similarly, points to the right of rp are re-mapped to the region between an upper value Wr and Ar. Values brighter than this region are not used.

Figure 23:
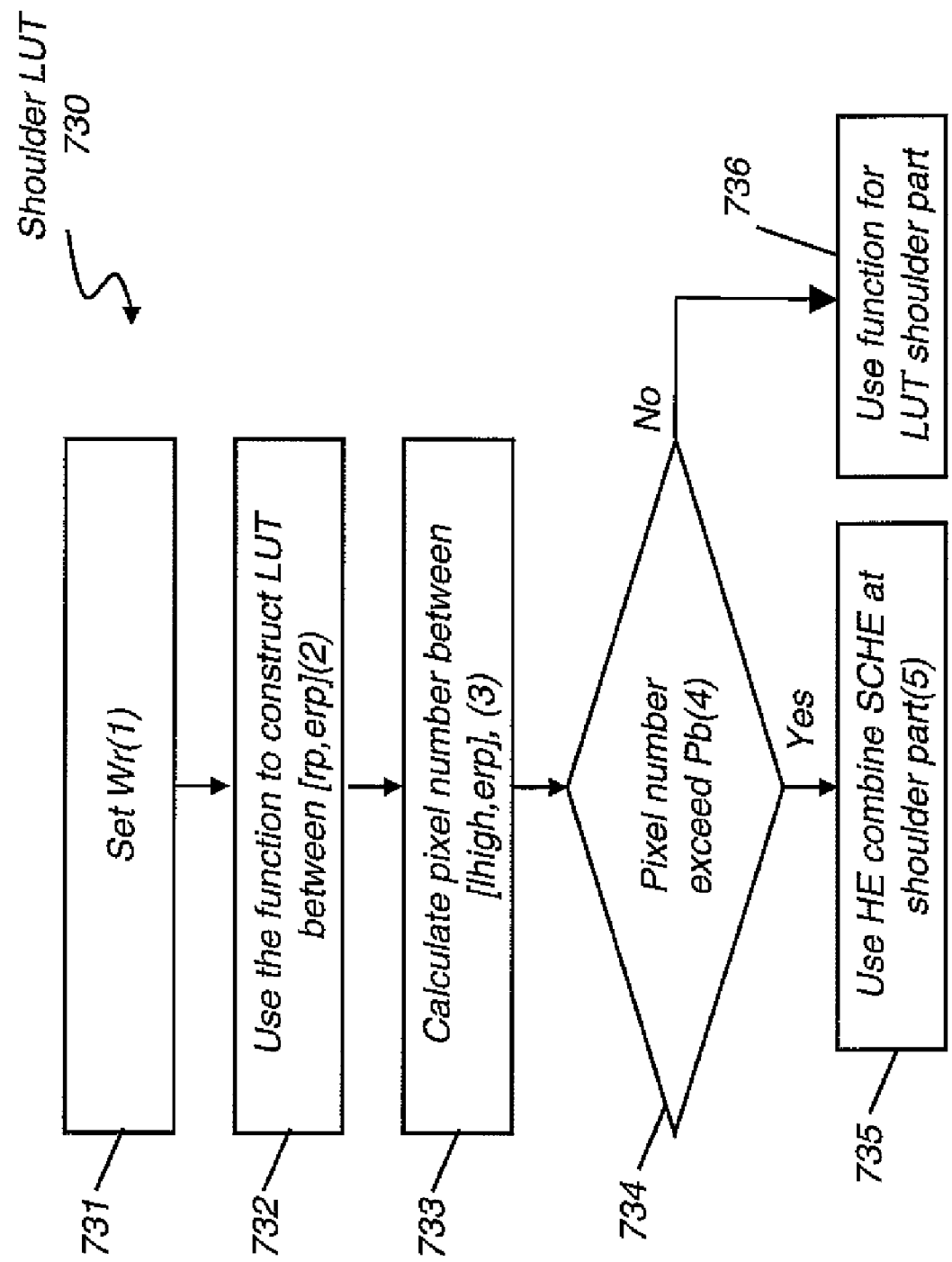
FIG. 23 is a block diagram showing logic flow steps for computing LUT values for the shoulder portion of the image data according to one embodiment.

The block diagram of FIG. 23 shows logic flow steps for computing LUT values for the shoulder portion of the image data in one embodiment. In a set Wr value step 731, a value is set for upper value Wr for this patient. The erp value will be mapped to this value. Empirically determined, a typical Wr value is 3750. A partial LUT construction step 732 follows. In this step, for each pixel value i, the following shoulder adjustment value can be computed:

$$LUT(i) = mspu + \frac{Wr - mspu}{1 + 10^{\frac{\beta(x_{0l}-i)}{1000}}} \quad i = rp+1, rp+2 \ldots erp \quad (eq. 12)$$

wherein mpsu corresponds to the upper spine value spuv, as described earlier. A calculate pixel number step 733 executes. Here, value lhigh is the gray level mapping to Wr−100 (or Wr less some other offset value) in the previous function for LUT shoulder part construction. In a pixel number check step 734, the number of values is checked against an empirically determined number Pb. If below this number, the LUT can be computed in a shoulder LUT construction step 736 using the following function:

$$LUT(i) = \left(\frac{\sum_{k=rp}^{i} h(k)}{\sum_{k=rp}^{erp} h(k)}\right) \cdot (Wr - Ar) \cdot ratio + \quad (eq. 13)$$

$$\left(\frac{\sum_{k=rp}^{i} sh(k)}{\sum_{k=rp}^{erp} sh(k)}\right) \cdot (Wr - Ar) \cdot (1 - ratio) + Ar$$

where $h(k)$ is the histogram(normalized) of
the images $sh(k)$ is the spatial correlated
histogram of the image, $0 \le ratio \le 1$ If the number of values exceeds Pb, the number of pixel values exceeds an expected range, possibly indicating that pixels in this region have diagnostic relevance. In such a case, a combination step 735 is executed for histogram equalization (HE), for example, using spatial correlation histogram equalization (SCHE).

Figure 24:
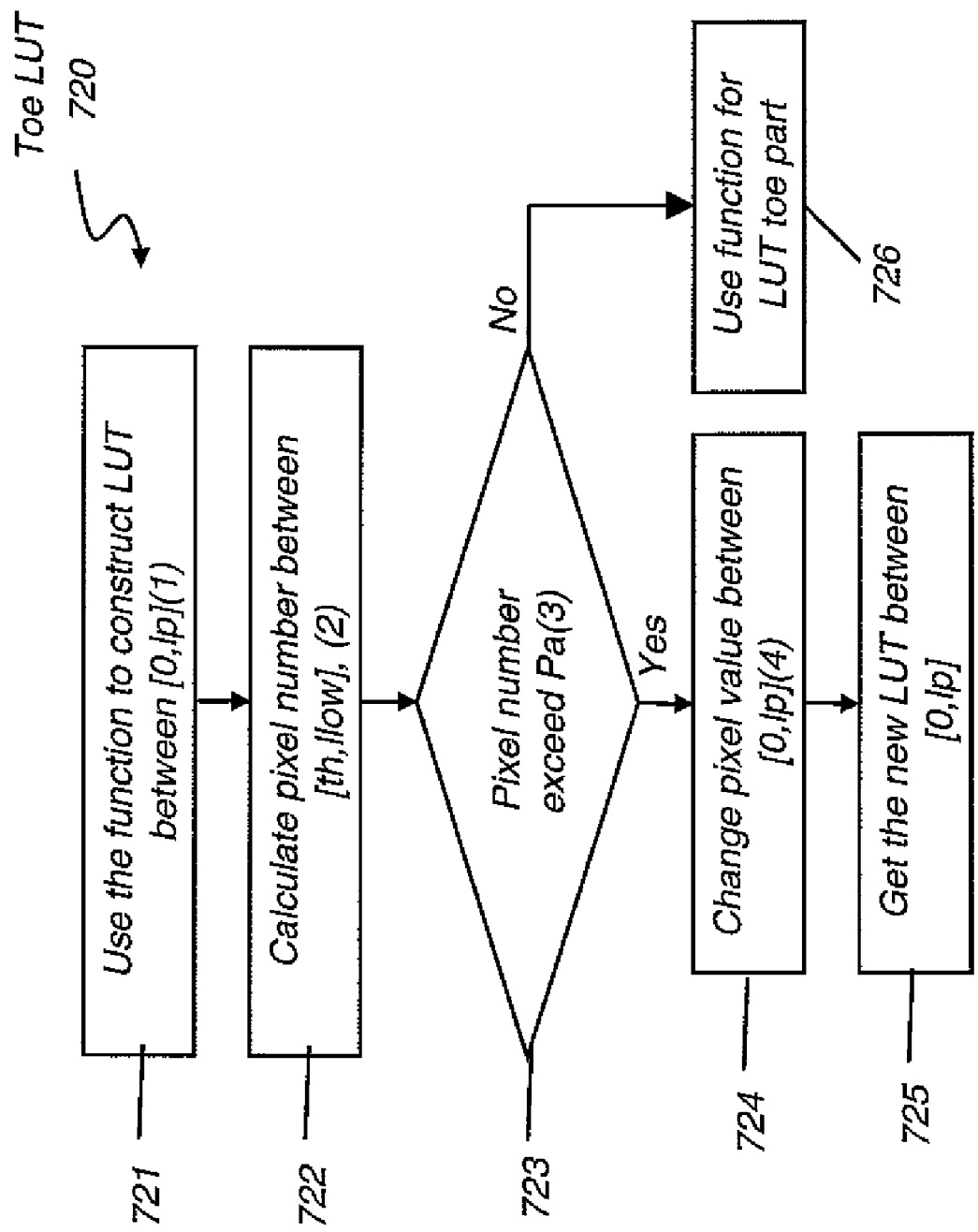
FIG. 24 is block diagram showing logic flow steps for computing LUT values for the toe portion of the image data.

The block diagram of FIG. 24 shows logic flow steps for computing LUT values for the toe portion of the image data. A partial LUT construction step 721 employs a function for mapping LUT values in the region [0,lp]. In one embodiment, the following function is applied:

$$LUT(i) = \frac{mspu}{1 + 10^{\frac{\beta(x_{0l}-i)}{1000}}} \quad i = 0, 1, \ldots lp \quad (eq. 14)$$

where mpsu is the mapping value of spuv in the LUT for the region of interest (ROI).

The next steps can change the input condition of certain pixel values prior to LUT submission. A calculate pixel number step 722 follows, in which the number of pixels (Pa) is counted between a threshold value for the background th and value llow, where llow is less than lp. In a pixel number check step 723, number Pa is checked against an empirically determined threshold value to determine if a significant number of pixels have values in this region. This can indicate pixels having diagnostically relevant values. If not, a toe LUT construction step 726 is executed, remapping all toe region values for pixels i in [0,lp].

If the number of pixels having this value exceeds Pa, then a pixel value change step 724 is executed, changing the values to which LUT(i) is to be applied using: G(i)=(lp−i)*k+i*(l−k) where 0<k<1 is a parameter. A low value LUT step 726 follows, applying LUT(i) to the remapped values.

Shoulder adjustment can be computed as follows:

$$LUT(i) = Wl + \frac{Wr - Wl}{1 + 10^{\exp}}$$

wherein:

$$\exp = \frac{\beta(x_{0r} - i)}{1000}$$

$$slope_{right} = LUT(rp) - LUT(rp - 1)$$

$$Wr = \text{round } [0.6 * slope_{right}(frp - rp) + Ar]$$

$$LUT(i) = \left( \frac{\sum_{k=rp}^{i} h(k)}{\sum_{k=rp}^{erp} h(k)} \right) * (Wr - Ar) + Ar$$

wherein h(k) is the pixel number at gray level k.

Toe adjustment can be computed as follows:

$$LUT(i) = Wl + \frac{Wr - Wl}{1 + 10^{\exp}}$$

wherein:

$$\exp = \frac{\beta(x_{0r} - i)}{1000}$$

$$slope_{right} = LUT(rp) - LUT(rp - 1)$$

$$LUT(i) = \left( \frac{\sum_{k=th1}^{i} h(k)}{\sum_{k=th1}^{erp} h(k)} \right) * (\Delta) + Al$$

wherein:

$$\Delta = slope_{left} * \left( \frac{1}{h(lp)} * \sum_{i=th1}^{lp} h(i) \right)$$

where th1 is the background threshold

Figure 11:
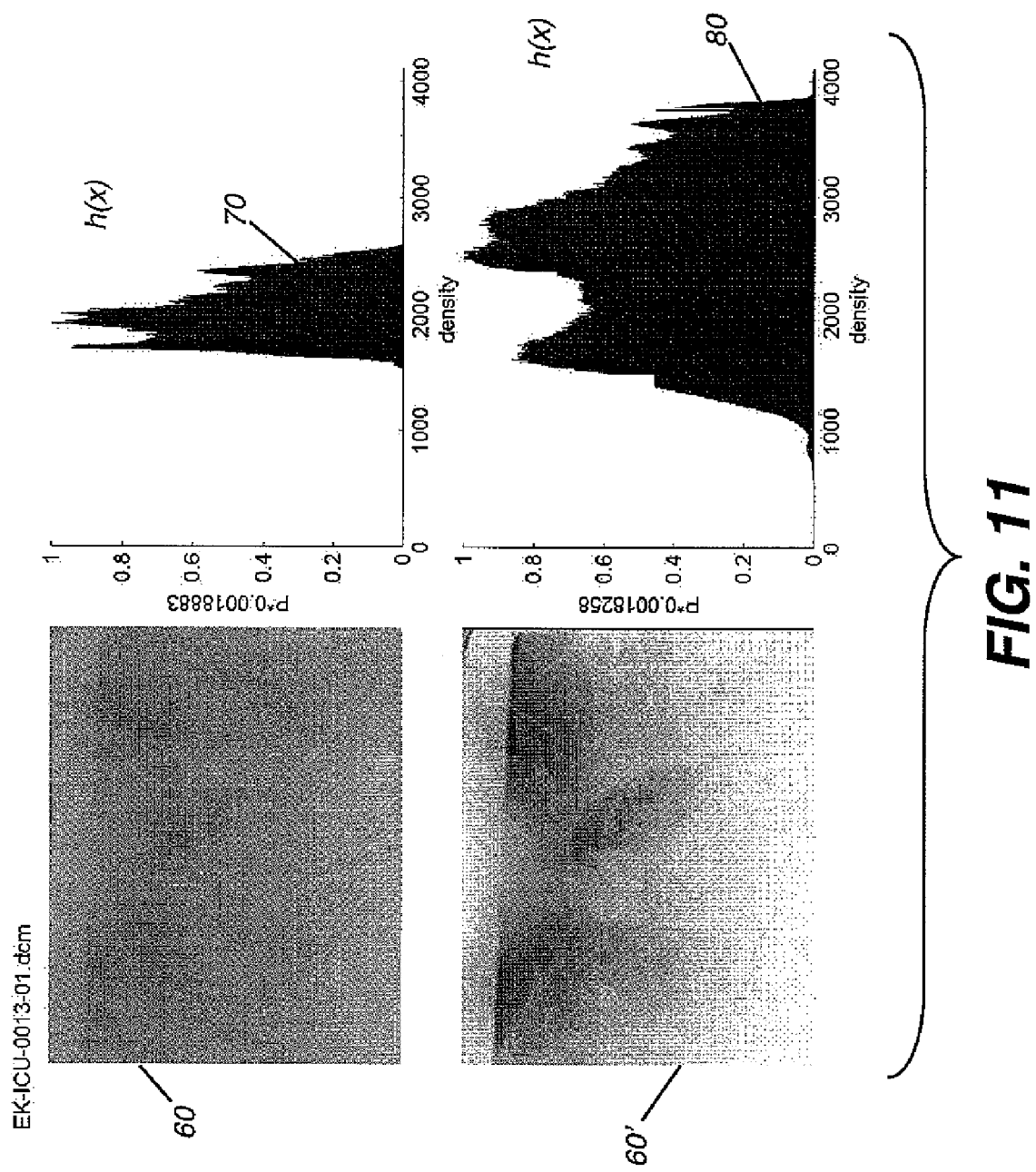
FIG. 11 shows the effects of remapping image data for an image having no background content.
Figure 12:
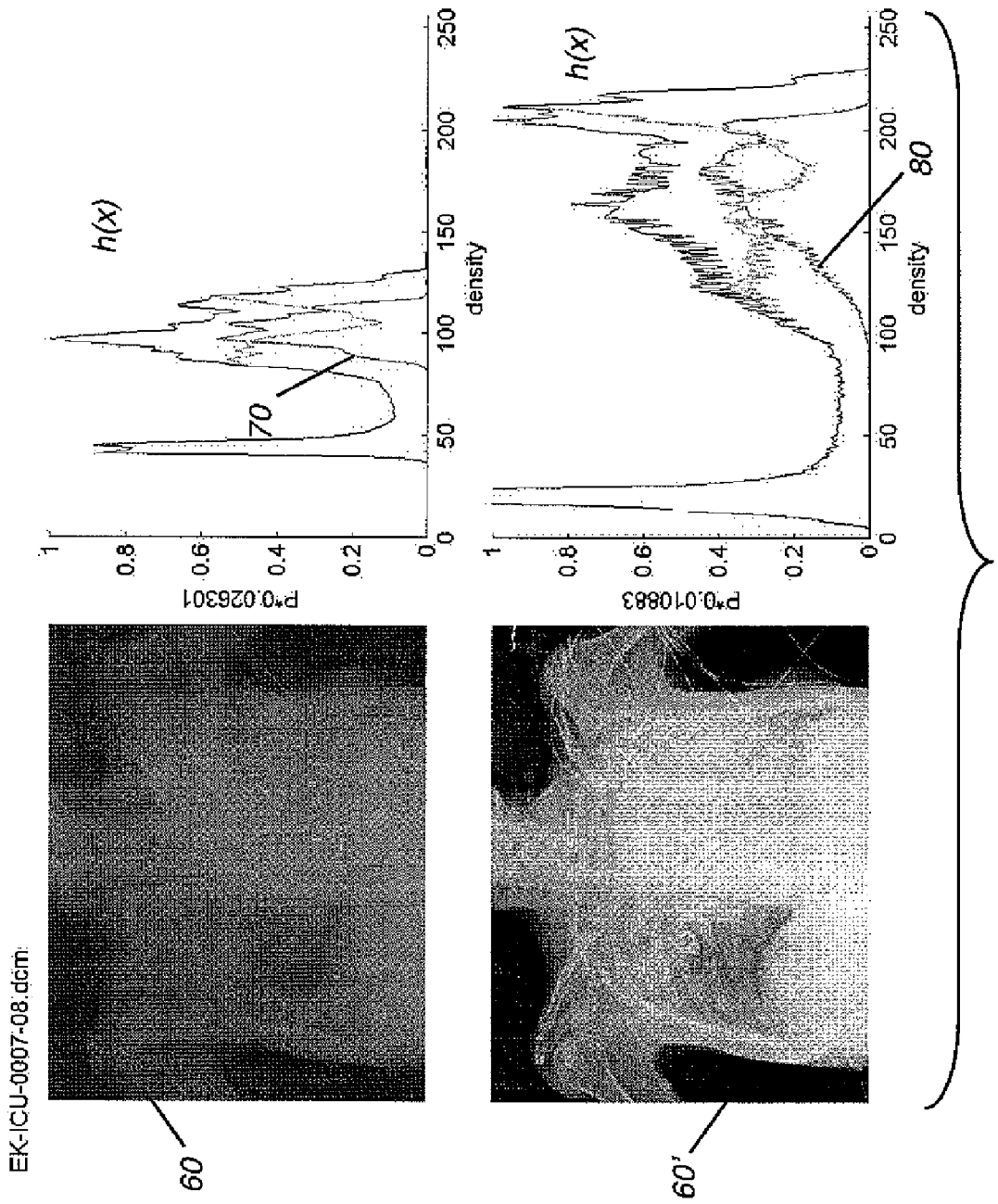
FIG. 12 shows the effects of remapping image data for an image having significant image content.

FIGS. 11 and 12 show examples of different chest x-ray images 60 that show improvement following the image transformation of the present invention. Transformed images are denoted as images 60'. FIG. 11 shows the affect of this transformation on a Type I image having no background content, as described earlier. FIG. 12 shows how this transformation affects; a Type IV image.

A checking and refinement step 150 in FIG. 3 performs some basic tests and checks to ascertain that image processing done by the preceding steps provided images that can be compared using CAD tools.

In an LUT generation step 160 in FIG. 3, suitable look-up tables (LUTs) are provided for processing each of the images prior to submission to CAD processing.

Figure 15:
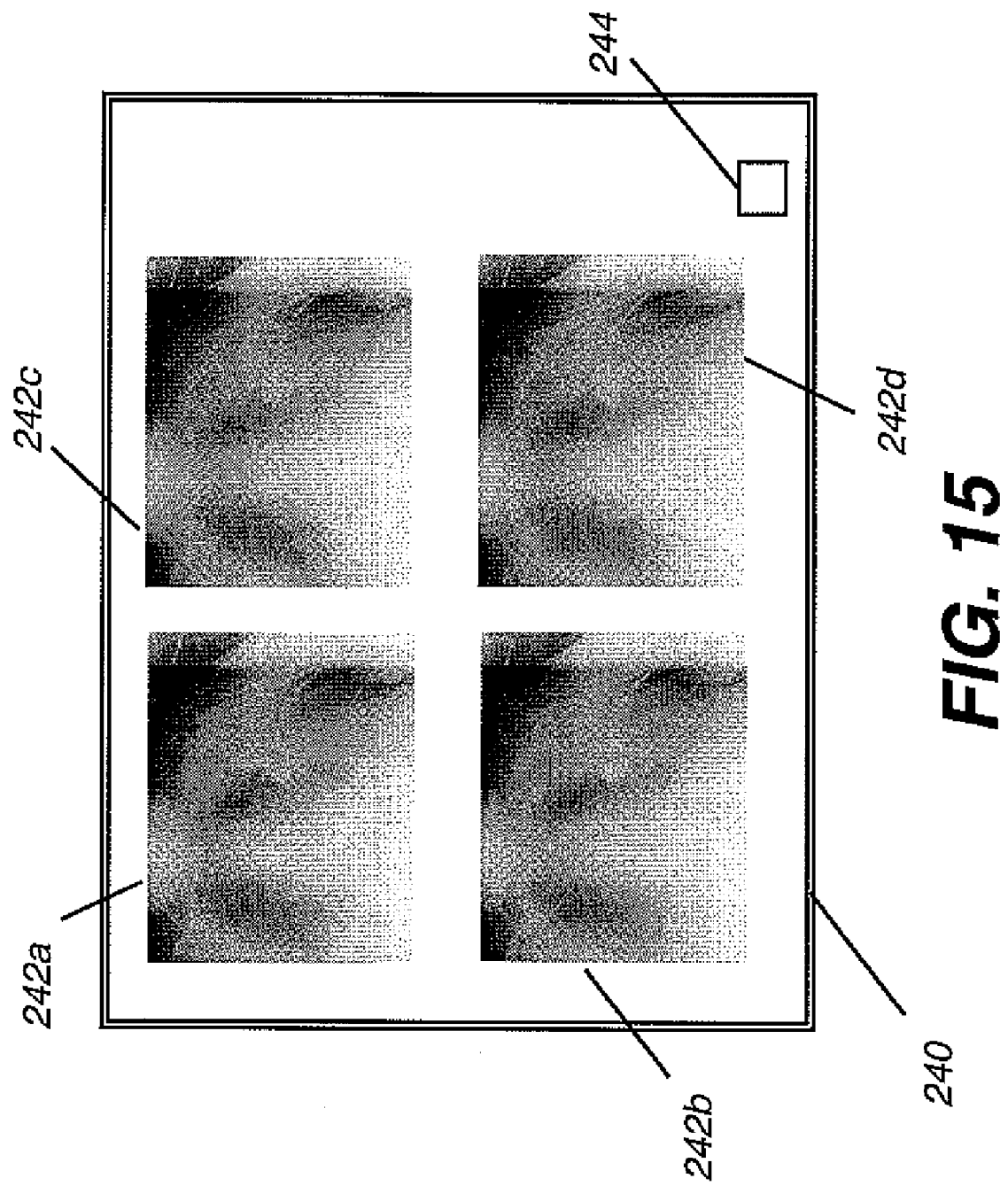
FIG. 15 shows a plan view of an image display with multiple images for a patient, taken at different times.

The plan view of FIG. 15 shows an example display 240 with the option of chronologically arranged data displayed for the clinician. Images 242a, 242b, 242c, and 242d, obtained at a time t1 for this patient, are stored on the PACS system. An icon 244 on display 240 enables selection of images of the same view from an earlier imaging session, t2. Other controls and commands could be provided to initiate CAD operation for a particular image or to flag an area of interest on one or more images for further analysis. Alternative display arrangements for images and measured data can also be obtained at different times t1, t2, . . . tn. For example, images 242a, 242b, 242c, and 242d can be obtained from substantially the same body tissue, but captured at different times, and arranged on display 240 using staggered windows, following the well-known windowing scheme familiar to personal computer users. This allows the clinician to use standard window selection, positioning, and sizing tools for obtaining a larger view of any individual image or for placing two images 242a, 242b, 242c, or 242d side by side, for example. In addition, optional tabular data giving vital measurement data, presented using the windowing data presentation paradigm, can also be sized, positioned, and otherwise manipulated on a display monitor to suit the viewing clinician.

Using the method of the present invention, two or more images taken from the same patient, but at different times and possibly using different equipment and settings, can be provided with consistent treatment, so that comparison of the two or more images, either visually or using CAD assessment utilities, can be facilitated. The methods and apparatus of the present invention can help to provide improved care in an ICU or other type of critical care facility. Particularly well suited to support longitudinal tracking, the methods of the present invention can be used to provide imaging and other data in a chronologically sequenced arrangement, helping the clinician to be alerted to changes in the condition of a patient that can be detected using image and measured data. The present invention helps to standardize the presentation of image data so that information can be provided to medical personnel in a form that is straightforward to understand and to use.

As was noted earlier, the method of the present invention provides pre-processing for two or more images, enabling a more accurate comparison between images that may have been taken at different times, by different operators, or under different imaging conditions. In one embodiment of the present invention, an image processing system performs the consistent rendering processes described earlier, then provides further enhancement for one or both of the consistently rendered images. Image enhancement methods could include, for example, those described in the '691 Barski reference, cited earlier.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, as noted earlier, any of a number of different methods could be used for background segmentation step 106.

Thus, what is provided is an apparatus and method for enhancing diagnostic images taken at different times in order to provide consistent rendering for regions of interest.

PARTS LIST

50. Region of Interest (ROI)
52. Center Line

54. Lung Line
60, 60a, 60b, 60c, 60d, 60'. Image
62. Mask
64. Peak
66. Mask
70, 70a, 70b. Primary area
80, 80a, 80b. Adjusted primary area
90. ROI region
92. Shoulder Region
94. Toe Region
100. Initial Step
106. Segmentation step
110. Landmark identification step
120. Gray scale range selection step
130. Contrast adjustment step
160. LUT generation step
198. Structured request
200. PACS system
212. Clinician
214. Workstation
216. Request
218. Default display arrangement
220. Option instruction
222. Display alternate arrangement process instruction
224. Patient data
230. Obtain image sets step
232. Rendering consistency step
234. CAD processing step
236. CAD results display step
240. Display
242a, 242b, 242c, 242d. Images
244. Icon
300. Input step
310. Histogram generation step
320. Bounds calculation step
330, 340, 350. Classification step
360a, 360b, 360c. Threshold calculation step
400. Input step
410. Noise removal step
420. Location step
430. Centerline computation step
440. Outline step
450. Bound step
500. Input step
510. Intersection locator step
520. Proportion calculation step
530. Obtain Ar estimate step
531. Calculations
600. Calculate difference step
610. Calculate Al' step
620. Determine main range step
630. Obtain Al step
700. Gray level partitioning step
710. ROI region LUT construction step
711. Obtain values step
712. Image size reduction step
713. Image activity determination step
714. LUT generation step
720. Toe region LUT construction step
721. Partial LUT construction step
722. Calculate pixel number step
723. Pixel number check step
724. Pixel value change step
725. Low value LUT step
726. Toe LUT construction step
730. Shoulder region LUT construction step
731. Set Wr value step
732. Partial LUT construction step
733. Calculate pixel number step
734. Pixel number check step
735. Combination step
736. Shoulder LUT construction step
dh(x). Difference histogram
h(x). Histogram
elp. Effective left point
erp. Effective right point
lp. Left point
rp. Right point
Al. Remapped left point
Ar. Remapped right point
$L_c$. Column length
Wl. Lower left point
Wr. Upper right point

The invention claimed is:

1. A method carried out by a computer for providing consistent rendering of two or more diagnostic images obtained from substantially the same body tissue but taken at different times, according to a region of interest, the method comprising:
obtaining image data as input code values for each of two or more diagnostic images; wherein each of the two or more diagnostic images (a) is an original image produced by a diagnostic imaging scan of a patient, (b) is different from any of the other diagnostic images, (c) is taken at different times, and (d) is of substantially the same body tissue of the patient;
identifying at least one region of interest in each diagnostic image;
identifying two points of from each region of interest;
computing an output value of each of the two input points of interest based on an analysis of the two or more diagnostic images; and
remapping the input code values for the region of interest to output code values for each of the two or more diagnostic images.

2. The method of claim 1 further comprising segmenting background image content from tissue image content for each of the two or more diagnostic images.

3. The method of claim 2 wherein segmenting comprises: generating a histogram of the image data values; and deriving a background threshold value according to background characteristics derived from the histogram.

4. The method of claim 1 wherein remapping of the input code values further comprises identifying an area within the region of interest that exhibits higher image activity.

5. The method of claim 4 wherein the increase in image activity for the area causes an increase in the range of remapping values for that area.

6. The method of claim 1 wherein the diagnostic images are images of the human chest.

7. The method of claim 1 wherein remapping of the input code values further comprises generating a look-up table.

8. The method of claim 1 wherein identifying corresponding structures comprises identifying a central portion of a lung.

9. The method of claim 1 wherein identifying corresponding structures comprises identifying an outline of a lung.

10. The method of claim 1 wherein remapping of the input code values further comprises mapping the input code values for pixels outside the region of interest.

11. The method of claim 1 wherein the upper remapping values for at least two of the two or more diagnostic images are different.

12. The method of claim 1 further comprising enhancing at least one of the two or more diagnostic images after remapping of the input code values.

13. A method carried out by a computer for image segmentation of foreground image tissue content from background, the method comprising:
   a) obtaining an image histogram according to image data values;
   b) generating a difference histogram by subtracting a smoothed histogram from the image histogram;
   c) forming a bounded histogram by determining the histogram left and right bounds according to image activity and the difference histogram;
   d) classifying the image according to background content characteristics ascertained from the bounded histogram; into the following classes: Type I: no background; Type II: Background, but without a distinct background peak value; Type III: Background, having a background peak value and lower values between the background peak value and the values of pixels that provide the tissue image content; Type IV: Background, having a peak value and a higher "valley" between the background peak and tissue content, such that there is a clear separation between the background and the tissue content;
   e) calculating a segmentation threshold according to the classification obtained in step d) and characteristics of the bounded histogram near its left bound; and
   f) segmenting the image according to the segmentation threshold.

14. A method carried out by a computer for providing consistent rendering of two or more diagnostic images according to a region of interest, the method comprising:
   obtaining image data as input code values for each of the two or more diagnostic images;
   identifying corresponding structures within the tissue image content of the image data and identifying the region of interest within the tissue image content for each of the two or more diagnostic images; and
   remapping the input code values for the region of interest to output code values for each of the two or more diagnostic images with the steps of:
      calculating an upper remapping value that is conditioned according to relative spatial position of the region of interest within the diagnostic image content for each diagnostic image;
      calculating a lower remapping value that is conditioned by a normalization factor; and
      remapping the input code values for each pixel within the region of interest to a remapped value in the range defined between and including the upper remapping value and the lower remapping value.

15. The method of claim 14 wherein the normalization factor is obtained according to input code values from an area that is within the diagnostic image and that lies outside the region of interest.

16. The method according to claim 15 wherein the normalization factor is obtained according to input code values from the spine.

17. The method of claim 14 wherein the lower remapping values for at least two of the two or more diagnostic images are different.

18. The method of claim 14 further comprising remapping the input code values that are brighter than those input code values within the region of interest to a range of values above the upper remapping value and less than or equal to a maximum value.

19. The method of claim 14 further comprising remapping the input code values that are darker than those input code values within the region of interest to a range of values below the lower remapping value and greater than or equal to a minimum value.

20. A method carried out by a computer for providing consistent rendering of two or more diagnostic images according to a region of interest, comprising:
   obtaining image data as input code values for each of two or more diagnostic images; wherein each of the two or more diagnostic images (a) is an original image produced by a diagnostic imaging scan of a patient, (b) is different from any of the other diagnostic images, (c) is taken at different times, and (d) is of substantially the same body tissue of the patient;
   identifying corresponding structures within the tissue image content of the image data and identifying the region of interest within the tissue image content for each of the two or more diagnostic images; and
   remapping the input code values for the region of interest to output code values for each of the two or more diagnostic images including the step of calculating an upper remapping value that is conditioned according to relative spatial position of the region of interest within the diagnostic image content for each diagnostic image.

21. A method carried out by a computer for providing consistent rendering of two or more diagnostic images according to a region of interest, comprising:
   obtaining image data as input code values for each of two or more diagnostic images; wherein each of the two or more diagnostic images (a) is an original image produced by a diagnostic imaging scan of a patient, (b) is different from any of the other diagnostic images, (c) is taken at different times, and (d) is of substantially the same body tissue of the patient;
   identifying corresponding structures within the tissue image content of the image data and identifying the region of interest within the tissue image content for each of the two or more diagnostic images; and
   remapping the input code values for the region of interest to output code values for each of the two or more diagnostic including the step of calculating a lower remapping value that is conditioned by a normalization factor.

22. The method of claim 1 wherein the points of interest are determined based on histogram analysis.

23. The method of claim 1 wherein the output values of the two points of interest depend upon the average value of the corresponding input values.

24. The method of claim 23 wherein the output values of the two points of interest are further adjusted by the difference between the two input values.

* * * * *